(12) United States Patent
Yamada

(10) Patent No.: US 12,135,518 B2
(45) Date of Patent: Nov. 5, 2024

(54) IMAGE FORMING APPARATUS

(71) Applicant: Oki Electric Industry Co., Ltd., Tokyo (JP)

(72) Inventor: Shin Yamada, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 6 days.

(21) Appl. No.: 18/335,550

(22) Filed: Jun. 15, 2023

(65) Prior Publication Data

US 2024/0111235 A1  Apr. 4, 2024

(30) Foreign Application Priority Data

Sep. 27, 2022 (JP) ................. 2022-153847

(51) Int. Cl.
| | | |
|---|---|---|
| *G03G 15/08* | (2006.01) | |
| *G03G 15/00* | (2006.01) | |
| *G03G 15/01* | (2006.01) | |

(52) U.S. Cl.
CPC ......... *G03G 15/50* (2013.01); *G03G 15/0126* (2013.01); *G03G 15/08* (2013.01)

(58) Field of Classification Search
CPC ..... G03G 15/0126; G03G 15/08; G03G 15/50
USPC .......................................... 399/53
See application file for complete search history.

(56) References Cited

U.S. PATENT DOCUMENTS

| | | |
|---|---|---|
| 2011/0234660 A1 | 9/2011 | Yoshida |
| 2012/0050801 A1 | 3/2012 | Itami |
| 2020/0329175 A1 | 10/2020 | Doi et al. |

FOREIGN PATENT DOCUMENTS

| | | | |
|---|---|---|---|
| JP | H1055085 A | | 2/1998 |
| JP | 2012185380 | * | 9/2012 |
| JP | 2019-113783 A | | 7/2019 |

\* cited by examiner

*Primary Examiner* — Hoan H Tran
(74) *Attorney, Agent, or Firm* — Rabin & Berdo, P.C.

(57) ABSTRACT

An image forming apparatus includes a first image forming section capable of forming a brilliant developer image, a second image forming section including at least one image forming section capable of forming a black developer image, a transfer section capable of transferring the brilliant developer image and the black developer image onto a medium, and a controller that controls operation of the first image forming section and the second image forming section according to received print data. When forming a brilliant image based on the print data, the controller performs control to form the brilliant image in which relative position between the brilliant developer image and the black developer image is changed depending on a medium type.

15 Claims, 15 Drawing Sheets

FIG. 9

| EXAMPLE 1-1 | 10-POINT MEAN ROUGHNESS Rz [μm] | EVALUATION TEST RESULTS | | | | JUDGMENT |
|---|---|---|---|---|---|---|
| | | LUMINOUS REFLECTANCE DIFFERENCE ΔY | FI VALUE | TEXTUREDNESS | LUSTER IRREGULARITY | |
| COAT PAPER | 2.4 | 30.2 ○ | 11.5 ○ | ○ | ○ | ○ |
| HIGH-QUALITY PAPER | 15.3 | 32.1 ○ | 8.7 ○ | × | ○ | △ |
| PLAIN PAPER | 26.5 | 30.1 ○ | 7.6 × | × | × | × |

FIG. 10

| EXAMPLE 1-2 | 10-POINT MEAN ROUGHNESS Rz [μm] | EVALUATION TEST RESULTS | | | | JUDGMENT |
|---|---|---|---|---|---|---|
| | | LUMINOUS REFLECTANCE DIFFERENCE ΔY | FI VALUE | TEXTUREDNESS | LUSTER IRREGULARITY | |
| COAT PAPER | 2.4 | 28.8 × | 11.0 ○ | ○ | ○ | △ |
| HIGH-QUALITY PAPER | 15.3 | 32.1 ○ | 9.0 ○ | ○ | ○ | ○ |
| PLAIN PAPER | 26.5 | 30.6 ○ | 8.4 ○ | ○ | ○ | ○ |

FIG. 11(A)

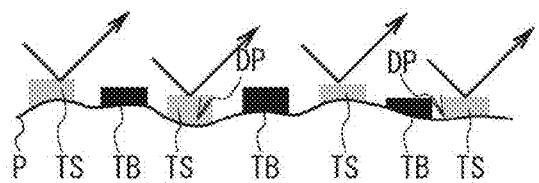

FIG. 11(B)

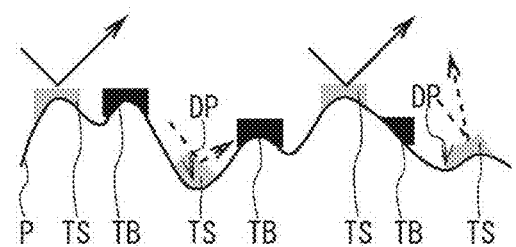

FIG. 11(C)

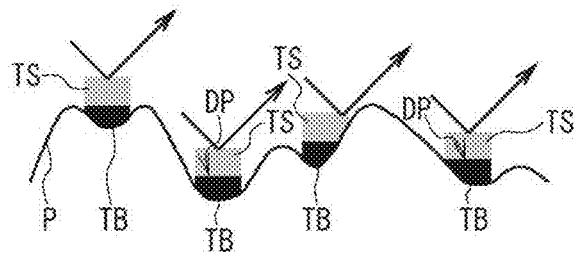

FIG. 14

| OVERLAP RATE [%] | EVALUATION TEST RESULTS ||||  JUDGMENT |
|---|---|---|---|---|---|
| | LUMINOUS REFLECTANCE DIFFERENCE ΔY | | FI VALUE | | TEXTUREDNESS | LUSTER IRREGULARITY | |

COAT PAPER (10-POINT MEAN ROUGHNESS Rz = 2.4 [μm])

| OVERLAP RATE [%] | LUMINOUS REFLECTANCE DIFFERENCE ΔY | | FI VALUE | | TEXTUREDNESS | LUSTER IRREGULARITY | JUDGMENT |
|---|---|---|---|---|---|---|---|
| 0 | 30.2 | ○ | 11.5 | ○ | ○ | ○ | ○ |
| 50 | 30.0 | ○ | 9.9 | ○ | ○ | ○ | ○ |
| 100 | 28.8 | × | 11.0 | ○ | ○ | ○ | △ |
| COMPARATIVE EXAMPLE | 34.5 | ○ | 11.3 | ○ | × | ○ | △ |

FIG. 15

HIGH-QUALITY PAPER (10-POINT MEAN ROUGHNESS Rz = 15.3 [μm])

| OVERLAP RATE [%] | LUMINOUS REFLECTANCE DIFFERENCE ΔY | | FI VALUE | | TEXTUREDNESS | LUSTER IRREGULARITY | JUDGMENT |
|---|---|---|---|---|---|---|---|
| 0 | 32.1 | ○ | 8.7 | ○ | × | ○ | △ |
| 50 | 34.7 | ○ | 9.4 | ○ | ○ | ○ | ○ |
| 100 | 32.1 | ○ | 9.0 | ○ | ○ | ○ | ○ |
| COMPARATIVE EXAMPLE | 35.5 | ○ | 12.1 | ○ | △ | ○ | △ |

FIG. 16

PLAIN PAPER (10-POINT MEAN ROUGHNESS Rz = 26.5 [μm])

| OVERLAP RATE [%] | LUMINOUS REFLECTANCE DIFFERENCE ΔY | | FI VALUE | | TEXTUREDNESS | LUSTER IRREGULARITY | JUDGMENT |
|---|---|---|---|---|---|---|---|
| 0 | 30.1 | ○ | 7.6 | × | × | × | × |
| 50 | 31.1 | ○ | 8.2 | ○ | △ | △ | △ |
| 100 | 30.6 | ○ | 8.4 | ○ | ○ | ○ | ○ |
| COMPARATIVE EXAMPLE | 35.8 | ○ | 12.9 | ○ | ○ | × | △ |

FIG. 19

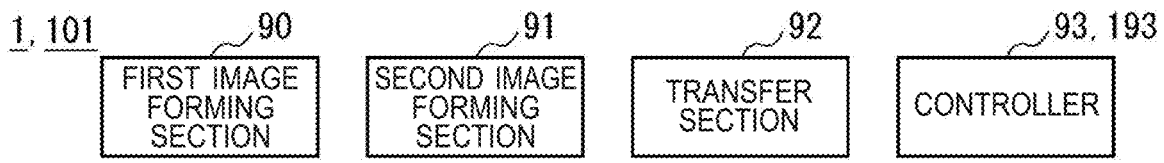

FIG. 20

| EXAMPLE 3-1 | SHEET THICKNESS [g/m²] | 10-POINT MEAN ROUGHNESS Rz [μm] | EVALUATION TEST RESULTS | | JUDGMENT |
|---|---|---|---|---|---|
| | | | LUMINOUS REFLECTANCE DIFFERENCE ΔY | FI VALUE | |
| THIN PAPER | 100 | 16.1 | 34.2 ○ | 11.2 ○ | ○ |
| REGULAR PAPER | 200 | 16.6 | 35.0 △ | 11.4 ○ | △ |
| THICK PAPER | 300 | 17.1 | 36.3 × | 11.3 ○ | × |

FIG. 21

| EXAMPLE 3-2 | SHEET THICKNESS [g/m²] | 10-POINT MEAN ROUGHNESS Rz [μm] | EVALUATION TEST RESULTS | | JUDGMENT |
|---|---|---|---|---|---|
| | | | LUMINOUS REFLECTANCE DIFFERENCE ΔY | FI VALUE | |
| THIN PAPER | 100 | 16.1 | 32.1 × | 12.1 ○ | × |
| REGULAR PAPER | 200 | 16.6 | 32.8 ○ | 10.7 ○ | ○ |
| THICK PAPER | 300 | 17.1 | 33.6 ○ | 11.4 ○ | ○ |

FIG. 22(A)
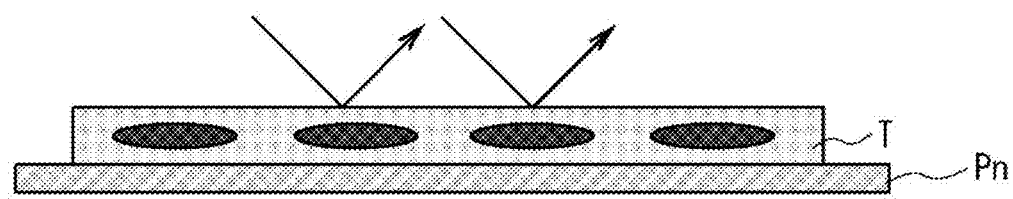
FIG. 22(B)
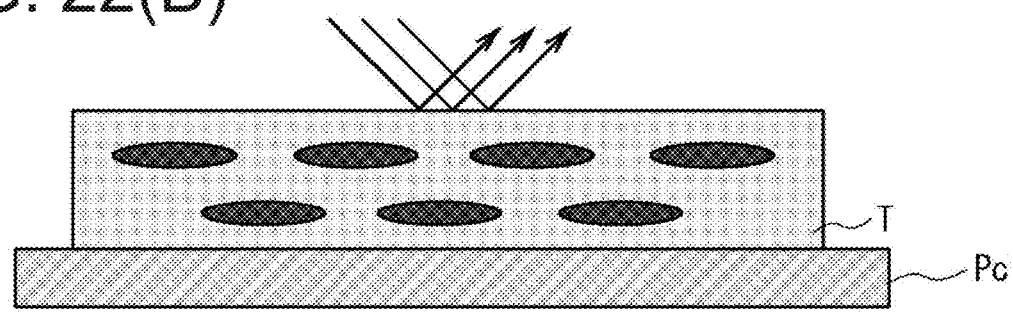
FIG. 22(C)
| THICK PAPER (SHEET THICKNESS = 300 [g/m²]) | | | |
|---|---|---|---|
| FIXATION TEMPERATURE | STANDARD VALUE | STANDARD VALUE + 5 [°C] | STANDARD VALUE + 10 [°C] (DEVICE SETTING UPPER LIMIT) |
| LUMINOUS REFLECTANCE DIFFERENCE ΔY | 37.6 × | 36.8 × | 36.1 △ |
| FIXATION IRREGULARITY | ○ | △ | × |

FIG. 23

| THIN PAPER (SHEET THICKNESS = 100 [g/m²]) ||||
|---|---|---|---|
| OVERLAP RATE [%] | EVALUATION TEST RESULTS || JUDGMENT |
| | LUMINOUS REFLECTANCE DIFFERENCE ΔY | FI VALUE | |
| 0 | 34.2 ○ | 11.2 ○ | ○ |
| 50 | 32.8 ○ | 11.9 ○ | ○ |
| 100 | 32.1 △ | 12.1 ○ | △ |
| COMPARATIVE EXAMPLE | 35.9 △ | 15.8 ○ | △ |

FIG. 24

| REGULAR PAPER (SHEET THICKNESS = 200 [g/m²]) ||||
|---|---|---|---|
| OVERLAP RATE [%] | EVALUATION TEST RESULTS || JUDGMENT |
| | LUMINOUS REFLECTANCE DIFFERENCE ΔY | FI VALUE | |
| 0 | 35.0 △ | 11.4 ○ | △ |
| 50 | 33.5 ○ | 10.2 ○ | ○ |
| 100 | 32.8 ○ | 10.7 ○ | ○ |
| COMPARATIVE EXAMPLE | 37.7 × | 14.2 ○ | △ |

FIG. 25

| THICK PAPER (SHEET THICKNESS = 300 [g/m²]) ||||
|---|---|---|---|
| OVERLAP RATE [%] | EVALUATION TEST RESULTS || JUDGMENT |
| | LUMINOUS REFLECTANCE DIFFERENCE ΔY | FI VALUE | |
| 0 | 36.3 × | 11.3 ○ | △ |
| 50 | 34.5 △ | 10.8 ○ | △ |
| 100 | 33.6 ○ | 11.4 ○ | ○ |
| COMPARATIVE EXAMPLE | 38.4 × | 14.8 ○ | × |

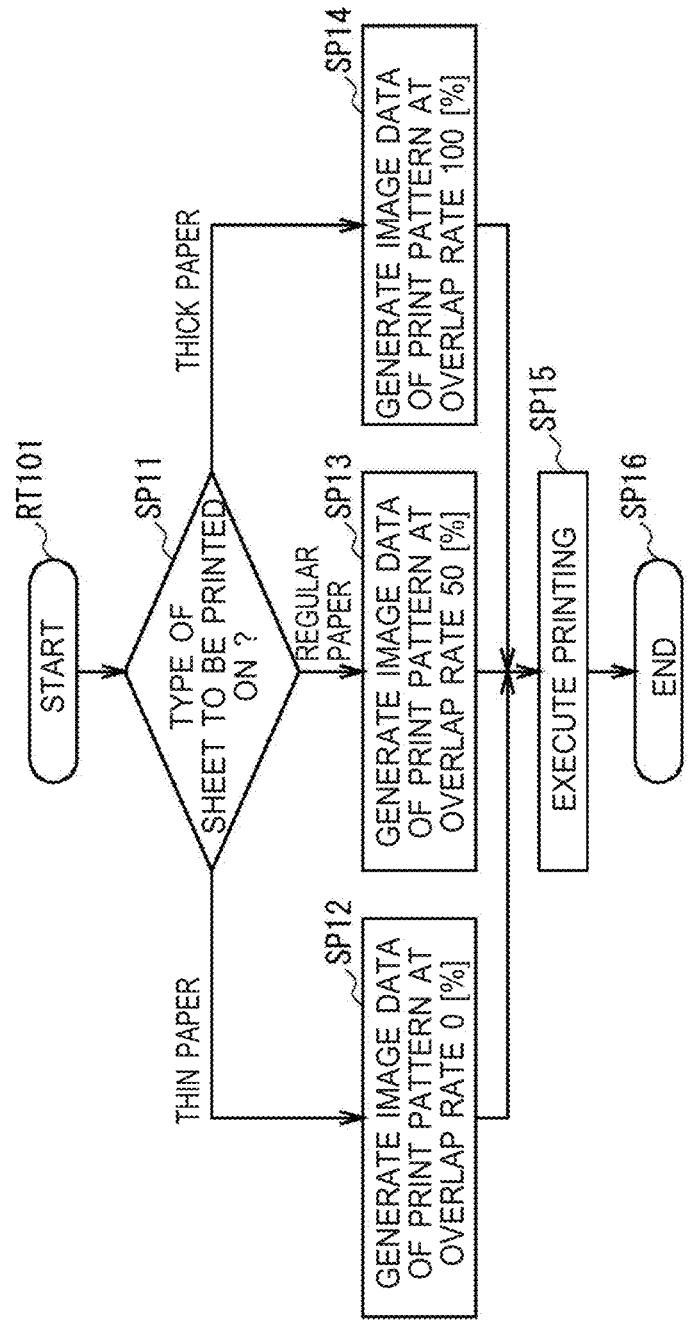

IMAGE FORMING APPARATUS

BACKGROUND OF THE INVENTION

1. Field of the Invention

The present disclosure relates to an image forming apparatus, and is suitable for application to printers of the electrophotographic type, for example.

2. Description of the Related Art

Conventionally, there has been widespread an image forming apparatus (referred to also as a printer) that performs a printing process by making an image forming unit form a developer image (referred to also as a toner image) by using developers (referred to also as toners) based on an image supplied from computer equipment or the like, transferring the developer image onto a medium such as paper, and fixing the image on the medium by applying heat and pressure to the image.

Further, among various developers, there are developers containing brilliant pigment like aluminum for the purpose of exhibiting brilliance or the like, such as a silver developer. Furthermore, among various image forming apparatuses, there is an image forming apparatus configured to form a print having metallic luster (FI value) by prescribing the weight-average molecular weight of the silver developer, the size of the brilliant pigment and the content of the brilliant pigment in the silver developer (see Patent Reference 1, for example).

Patent Reference 1: Japanese Patent Application Publication No. 2019-113783

SUMMARY OF THE INVENTION

Such image forming apparatuses are requested to increase the printing quality by achieving both of the metallic luster in the printed image and the color tone of the image.

The present disclosure is made in consideration of the above-described features, and the object of the present disclosure is to propose an image forming apparatus capable of achieving both of the metallic luster and the color tone of the image.

According to an aspect of the present disclosure, there is provided an image forming apparatus including a first image forming section capable of forming a brilliant developer image, a second image forming section including at least one image forming section capable of forming a black developer image, a transfer section capable of transferring the brilliant developer image and the black developer image onto a medium, and a controller that controls operation of the first image forming section and the second image forming section according to received print data. When forming a brilliant image based on the print data, the controller performs control to form the brilliant image in which relative position between the brilliant developer image and the black developer image is changed depending on a medium type.

According to another aspect of the present disclosure, there is provided an image forming apparatus including a first image forming section capable of forming a brilliant developer image, a second image forming section including at least one image forming section capable of forming a black developer image, a transfer section capable of transferring the brilliant developer image and the black developer image onto a first medium or a second medium whose surface is rougher than the first medium, and a controller that controls operation of the first image forming section and the second image forming section according to received print data. When forming a brilliant image on the second medium based on the print data, the controller performs control to form the brilliant image in which relative position between the brilliant developer image and the black developer image is changed in comparison with that on the first medium.

According to still another aspect of the present disclosure, there is provided an image forming apparatus including a first image forming section capable of forming a brilliant developer image, a second image forming section including at least one image forming section capable of forming a black developer image, a transfer section capable of transferring the brilliant developer image and the black developer image onto a first medium or a second medium thicker than the first medium, and a controller that controls operation of the first image forming section and the second image forming section according to received print data. When forming a brilliant image on the second medium based on the print data, the controller performs control to form the brilliant image in which a relative position between the brilliant developer image and the black developer image is changed in comparison with that on the first medium.

According to yet another aspect of the present disclosure, there is provided an image forming apparatus including a first image forming section capable of forming a brilliant developer image, a second image forming section including at least one image forming section capable of forming a black developer image, a transfer section capable of transferring the brilliant developer image and the black developer image onto a medium, a controller that controls operation of the first image forming section and the second image forming section according to received print data, and an input section through which a formation position of at least one of the brilliant developer image and the black developer image on the medium can be adjusted. When forming a brilliant image based on the print data, the controller performs control to form the brilliant image in which relative position between the brilliant developer image and the black developer image is changed depending on an input result of the input section.

According to further aspect of the present disclosure, there is provided an image forming apparatus including a first image forming section capable of forming a brilliant developer image, a second image forming section including at least one image forming section capable of forming a black developer image, a transfer section capable of transferring the brilliant developer image and the black developer image onto a medium, and a controller that controls operation of the first image forming section and the second image forming section according to received print data. When forming a brilliant image based on the print data, the controller performs control to form the brilliant image in which at least a part of the brilliant developer image and at least a part of the black developer image are superimposed on each other.

The present disclosure is capable of suppressing a decrease in the metallic luster (FI value) by reducing a developer amount of the brilliant developer image formed on the medium, and capable of supplementing the color tone of the image (luminous reflectance difference) by means of the black developer image.

According to the present disclosure, an image forming apparatus capable of achieving both of the metallic luster and the color tone of the image can be realized.

BRIEF DESCRIPTION OF THE DRAWINGS

FIG. 9 is a table showing evaluation results in an example 1-1.

FIG. 10 is a table showing evaluation results in an example 1-2.

FIGS. 11(A), 11(B) and 11(C) are diagrams showing reflection of light depending on smoothness of a sheet.

FIG. 14 is a table showing evaluation results in cases of coat paper.

FIG. 15 is a table showing evaluation results in cases of high-quality paper.

FIG. 16 is a table showing evaluation results in cases of plain paper.

FIG. 19 is a block diagram showing a functional configuration of the image forming apparatus.

FIG. 20 is a table showing evaluation results in an example 3-1.

FIG. 21 is a table showing evaluation results in an example 3-2.

FIGS. 22(A) and 22(B) are diagram showing conditions of the developer varying depending on sheet thickness of the sheet, and FIG. 22(C) is a table showing the luminous reflectance difference varying depending on the fixture temperature.

FIG. 23 is a table showing evaluation results in cases of thin paper.

FIG. 24 is a table showing evaluation results in cases of regular paper.

FIG. 25 is a table showing evaluation results in cases of thick paper.

FIG. 26 is a flowchart showing a print procedure according to a second embodiment.

DETAILED DESCRIPTION OF THE INVENTION

Modes for carrying out the invention (hereinafter referred to as embodiments) will be described below by using the drawings.

1. First Embodiment

1-1. Configuration of Image Forming Apparatus

Figure 1:
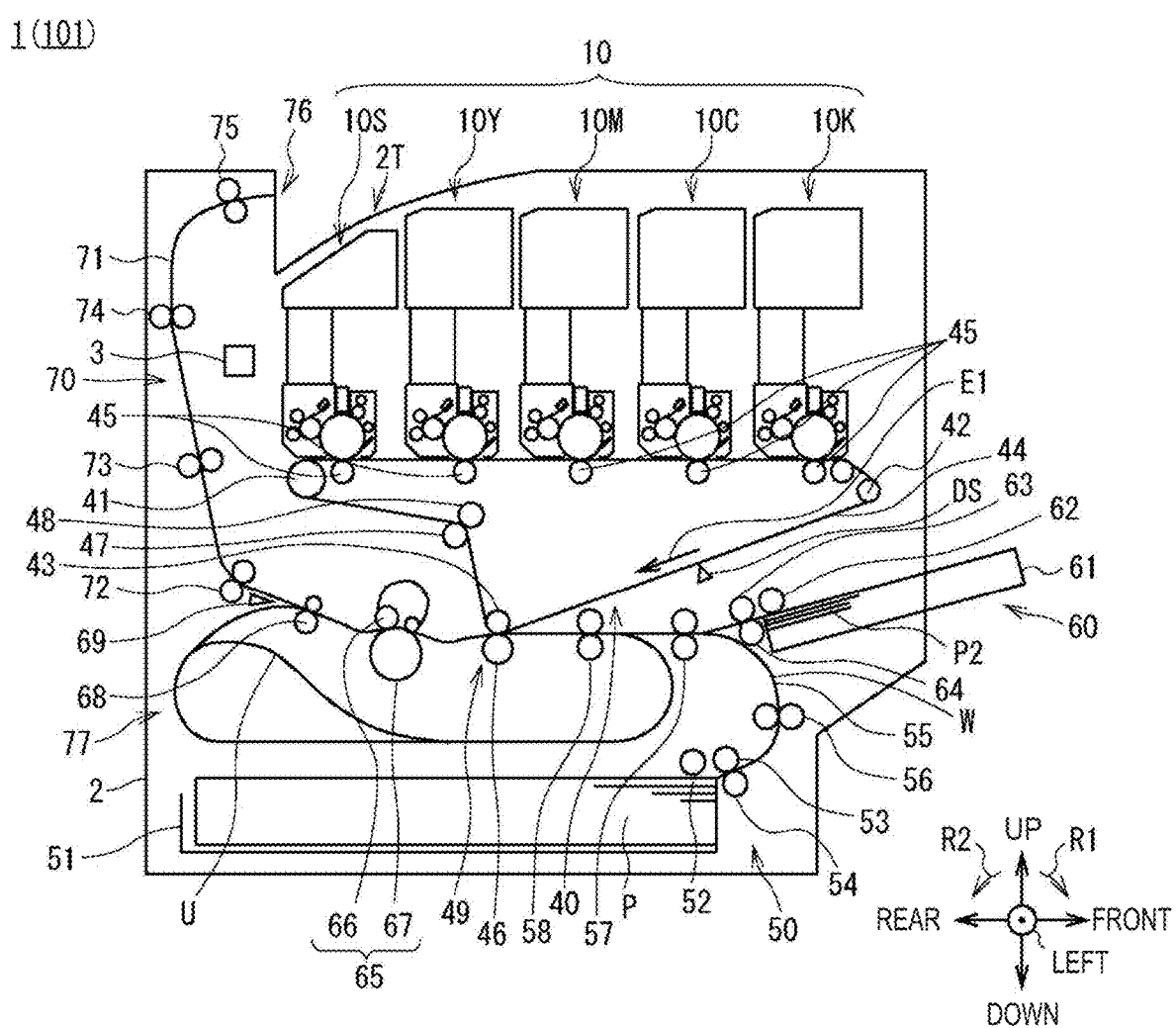
FIG. 1 is a left side view showing the configuration of an image forming apparatus.

As shown in FIG. 1, an image forming apparatus 1 according to this embodiment is a color printer of the electrophotographic type and forms (i.e., prints) a color image on a sheet P. Incidentally, the image forming apparatus 1 does not have an image scanner function of scanning a document, a communication function by use of a telephone circuit, or the like, and is configured as an SFP (Single Function Printer) having only the printer function.

The image forming apparatus 1 includes various components arranged in a housing 2 formed substantially in a box shape. Incidentally, the following description will be given by assuming that a right end part of the image forming apparatus 1 in FIG. 1 is the front of the image forming apparatus 1 and respectively defining an up/down direction, a transverse direction and a longitudinal direction as directions when the image forming apparatus 1 is viewed from the front.

A print controller 3 controls an entire operation of the image forming apparatus 1. This print controller 3 includes a CPU (Central Processing Unit) 23 (FIG. 3), a ROM (Read Only Memory), a RAM (Random Access Memory) and the like, and executes various processes by reading out and executing prescribed programs. Further, the print controller 3 is connected to a host device 20 (FIG. 3) such as computer equipment by wireless or wired connection. The print controller 3 executes a print process of forming a print image on the surface of the sheet P when image data representing an image of a print object is provided from the host device 20 and the printing of the image data is commanded.

On an upper side of a space inside the housing 2, five image forming units 10K, 10C, 10M, 10Y and 10S are successively arranged from the front side toward the rear side. While the image forming units 10K, 10C, 10M, 10Y and 10S correspond respectively to black (K), cyan (C), magenta (M), yellow (Y) and a special color (S), all of the image forming units 10K, 10C, 10M, 10Y and 10S are configured in the same way except for the color. Further, on the upper side of the space inside the housing 2, LED (Light Emitting Diode) heads 14 (FIG. 2) are arranged to respectively face the image forming units 10K, 10C, 10M, 10Y and 10s.

All of the black (K), cyan (C), magenta (M) and yellow (Y) are colors (hereinafter referred to as normal colors) used in generic color printers. In contrast, the special color (S) is a special color such as white (white color), clear (transparent color or no color) or silver (silver color). For convenience of description, the image forming units 10K, 10C, 10M, 10Y and 10S are hereinafter referred to collectively as image forming units 10.

Figure 2:
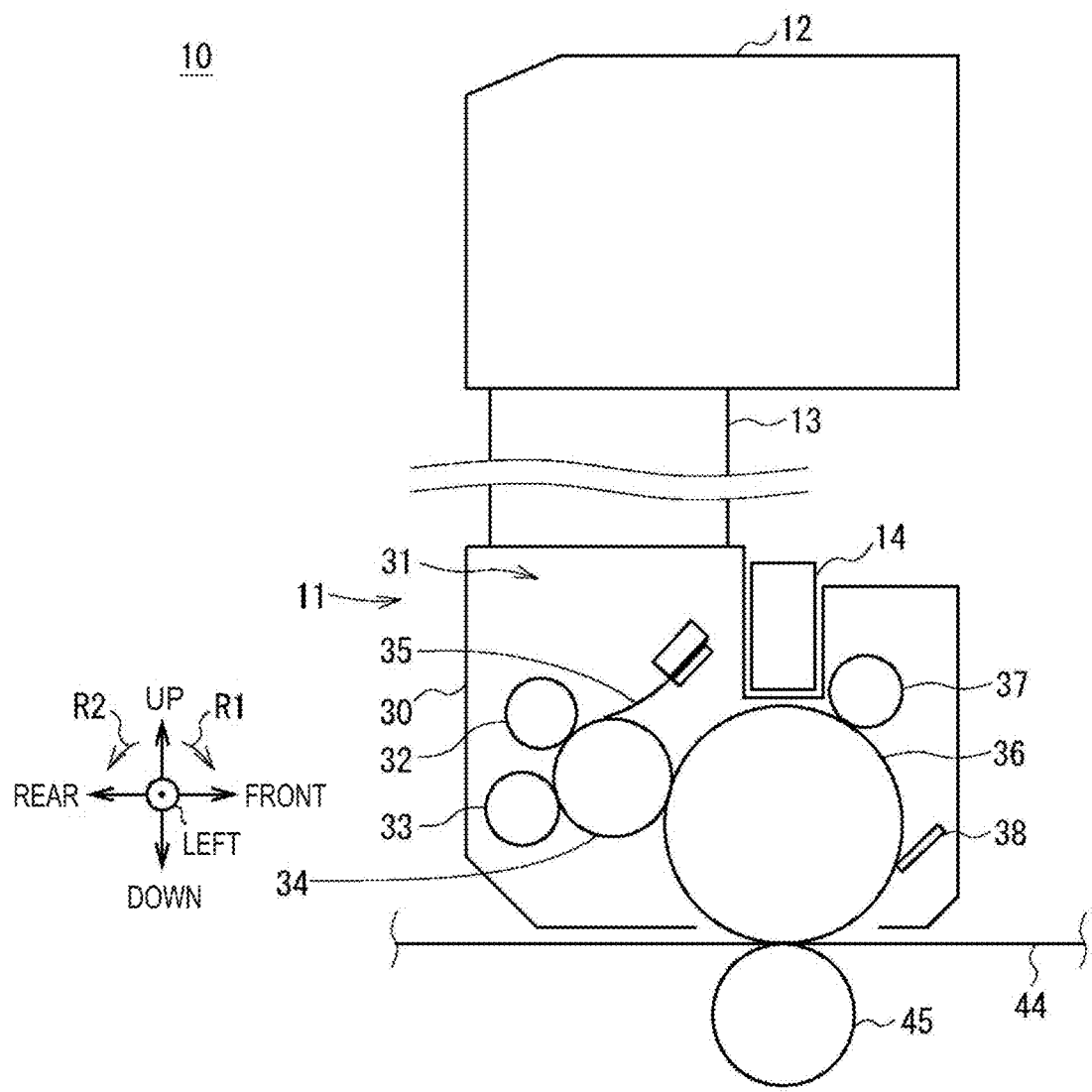
FIG. 2 is a left side view showing the configuration of an image forming unit.

As shown in FIG. 2, the image forming unit 10 is roughly made up of an image formation main unit 11, a developer container 12 and a developer supply section 13. Incidentally, the image forming unit 10 and components forming the image forming unit 10 have sufficient lengths in the transverse direction according to the length of the sheet P in the transverse direction. Therefore, each of many of the components has a length in the transverse direction relatively longer than lengths in the longitudinal direction and the up/down direction, and has a shape elongated in the transverse direction.

The developer container 12 stores a developer (i.e., a developing agent) therein and is configured to be attachable and detachable to/from the image forming unit 10. When this developer container 12 is attached to the image forming unit 10, the developer container 12 is attached to the image formation main unit 11 via the developer supply section 13. Incidentally, there are cases where the developer container 12 is referred to as a toner cartridge.

Incidentally, as the developer of the silver color, a developer containing brilliant pigment is used. For convenience of description, the developer of the silver color is hereinafter referred to also as a silver developer. As the developers of yellow, magenta, cyan and black, developers respectively containing organic-based pigments such as pigment yellow, pigment cyan, pigment magenta and carbon black are used. For convenience of description, the developers of yellow, magenta, cyan and black are hereinafter also referred to collectively as color developers. In this embodiment, the color developers having volume mean particle diameters of 6.5 [μm]±1.0 [μm] are used. Further, the color developers of yellow, magenta, cyan and black are hereinafter referred to also as a yellow developer, a magenta developer, a cyan developer and a black developer.

An image formation housing 30, a developer storage space 31, a first supply roller 32, a second supply roller 33, a development roller 34, a development blade 35, a photosensitive drum 36, a charging roller 37 and a cleaning blade 38 are installed in the image formation main unit 11 (FIG. 2). Among these components, each of the first supply roller 32, the second supply roller 33, the development roller 34, the photosensitive drum 36, and the charging roller 37 is formed in a cylindrical shape with its central axis extending in the transverse direction and is supported rotatably by the image formation housing 30.

Incidentally, in the image forming unit 10S of the special color (S), the developer container 12 storing the developer of a color previously selected by a user (clear color, gold color (gold), silver color (silver) or the like) is attached to the image formation main unit 11 via the developer supply section 13.

The developer storage space 31 stores the developer supplied from the developer container 12 via the developer supply section 13. An elastic layer made of electrically conductive urethane rubber foam or the like is formed on a circumferential side face of each of the first supply roller 32 and the second supply roller 33. An elastic layer having elasticity, a surface layer having electrical conductivity, and the like are formed on a circumferential side face of the development roller 34. The development blade 35 is made of a stainless steel plate with a prescribed thickness, for example, and a part of the development blade 35 slightly deformed elastically is placed in contact with the circumferential side face of the development roller 34.

A charge generation layer and a charge transport layer in the form of thin films are successively formed on a circumferential side face of the photosensitive drum 36 so that the photosensitive drum 36 can be electrically charged. A circumferential side face of the charging roller 37 is coated with an elastic body having electrical conductivity and is placed in contact with the circumferential side face of the photosensitive drum 36. The cleaning blade 38 is made of resin in the form of a thin plate, for example. A part of the cleaning blade 38 slightly deformed elastically is placed in contact with the circumferential side face of the photosensitive drum 36.

The LED head 14 is situated above the photosensitive drum 36 in the image formation main unit 11. This LED head 14 includes a plurality of light emitting element chips linearly arranged in the transverse direction and causes the light emitting elements to emit light in a light emission pattern based on an image data signal supplied from the print controller 3 (FIG. 1).

The image formation main unit 11 is supplied with driving force from a non-illustrated motor and thereby rotates the second supply roller 33, the development roller 34 and the charging roller 37 in the direction of the arrow R1 (clockwise in the drawing) and rotates the first supply roller 32 and the photosensitive drum 36 in the direction of the arrow R2 (counterclockwise in the drawing). Further, the image formation main unit 11 electrically charges the first supply roller 32, the second supply roller 33, the development roller 34, the development blade 35 and the charging roller 37 by applying prescribed bias voltages respectively to them based on control by the print controller 3.

The first supply roller 32 and the second supply roller 33 make the developer in the developer storage space 31 adhere to their circumferential side faces due to the electrical charging and then make the developer adhere to the circumferential side face of the development roller 34 due to the rotation. An excess developer is removed from the circumferential side face of the development roller 34 by the development blade 35, and the circumferential side face with the developer adhering thereto in the form of a thin film is placed in contact with the circumferential side face of the photosensitive drum 36.

On the other hand, the charging roller 37 in the charged state makes contact with the photosensitive drum 36 and thereby uniformly charges the circumferential side face of the photosensitive drum 36. The LED head 14 successively exposes the photosensitive drum 36 to light by emitting light at a prescribed time interval and in the light emission pattern based on the image data signal supplied from the print controller 3 (FIG. 1). By this operation, an electrostatic latent image is formed successively on the circumferential side face of the photosensitive drum 36 at a position in the vicinity of an upper end of the photosensitive drum 36.

Subsequently, the photosensitive drum 36 rotates in the arrow R2 direction, by which the part where the electrostatic latent image has been formed is placed in contact with the development roller 34. Accordingly, the developer adheres to the circumferential side face of the photosensitive drum 36 based on the electrostatic latent image, by which a developer image based on the image data is formed. The photosensitive drum 36 further rotates in the arrow R2 direction and thereby makes the developer image arrive at a position in the vicinity of a lower end of the photosensitive drum 36.

An intermediate transfer section 40 is arranged under the image forming units 10 in the housing 2 (FIG. 1). The intermediate transfer section 40 includes a drive roller 41, a driven roller 42, a backup roller 43, an intermediate transfer belt 44, (five) primary transfer rollers 45, a secondary transfer roller 46, and a reverse-deflection roller 47. Among these components, each of the drive roller 41, the driven roller 42, the backup roller 43, the primary transfer rollers 45, the secondary transfer roller 46 and the reverse-deflection roller 47 is formed in a cylindrical shape with its central axis extending in the transverse direction and is supported rotatably by the housing 2.

The drive roller 41 is arranged on a lower rear side relative to the image forming unit 10S and rotates in the arrow R1 direction when driving force is supplied from a non-illustrated belt motor. The driven roller 42 is arranged on a lower front side relative to the image forming unit 10K. Upper ends of the drive roller 41 and the driven roller 42 are situated at height equivalent to or slightly lower than the lower end of the photosensitive drum 36 (FIG. 2) in each image forming unit 10. The backup roller 43 is arranged on the lower front side relative to the drive roller 41 and on the lower rear side relative to the driven roller 42.

The intermediate transfer belt 44 is formed of a high-resistance plastic film as an endless belt, and is stretched across the drive roller 41, the driven roller 42 and the backup roller 43 so as to rotate around these rollers. Further, in the intermediate transfer section 40, five primary transfer rollers 45 are arranged under a part of the intermediate transfer belt 44 stretched between the drive roller 41 and the driven roller 42, namely, at positions respectively directly below the five image forming units 10 and respectively facing the photosensitive drums 36 across the intermediate transfer belt 44. The primary transfer rollers 45 as transfer sections are applied with a prescribed bias voltage based on the control by the print controller 3.

The secondary transfer roller 46 as a transfer section is situated directly below the backup roller 43 and is biased toward the backup roller 43. Namely, the intermediate transfer section 40 sandwiches the intermediate transfer belt 44 between the secondary transfer roller 46 and the backup roller 43. Further, a prescribed bias voltage is applied to the secondary transfer roller 46. In the following description, the secondary transfer roller 46 and the backup roller 43 are referred to collectively as a secondary transfer section 49.

The reverse-deflection roller 47 is situated at a position in front of and slightly lower than the drive roller 41 and higher than and slightly to the rear of the backup roller 43, and biases the intermediate transfer belt 44 in a forward and upward direction. By this arrangement, the intermediate transfer belt 44 is not slackened and is applied with tension between respective rollers. Further, a reverse-deflection backup roller 48 is provided at a position on an upper front side relative to the reverse-deflection roller 47 across the intermediate transfer belt 44.

The intermediate transfer section 40 rotates the drive roller 41 in the arrow R1 direction by the driving force supplied from the non-illustrated belt motor and thereby makes the intermediate transfer belt 44 travel in a direction along the arrow E1. Further, each primary transfer roller 45 rotates in the arrow R1 direction in a state where the prescribed bias voltage is applied thereto. By this operation, the image forming units 10 respectively transfer the developer images, each having arrived at the position in the vicinity of the lower end of the circumferential side face of the photosensitive drum 36 (FIG. 2), to the intermediate transfer belt 44 so as to successively overlay the developer images of the respective colors. On the surface of the intermediate transfer belt 44, the developer images of the respective colors are overlaid successively, starting from silver (S) on an upstream side. The intermediate transfer section 40 makes the intermediate transfer belt 44 travel and thereby causes the developer images transferred from the image forming units 10 to arrive at a position in the vicinity of the backup roller 43.

Additionally, a conveyance path W which is a path for conveying the sheet P is formed inside the housing 2 (FIG. 1). This conveyance path W extends in a forward and upward direction from a lowermost and relatively front position in the space inside the housing 2, makes approximately a half turn, and thereafter extends rearward under the intermediate transfer section 40. Subsequently, the conveyance path W is oriented upward, extends upward in a region to the rear of the intermediate transfer section 40 and the image forming unit 10S, and thereafter extends forward. In other words, the conveyance path W is formed in the form of the English uppercase letter "S" in FIG. 1. Inside the housing 2, various components are arranged along this conveyance path W.

A first sheet feed section 50 is arranged in the vicinity of a lower end of the space inside the housing 2 (FIG. 1). The first sheet feed section 50 includes a sheet cassette 51, a pickup roller 52, a feed roller 53, a retard roller 54, a conveyance guide 55, conveyance roller pairs 56, 57 and 58, and the like. Incidentally, each roller included in the pickup roller 52, the feed roller 53, the retard roller 54 and the conveyance roller pairs 56, 57 and 58 is formed in a cylindrical shape with its central axis extending in the transverse direction.

The sheet cassette 51 is formed in the form of a hollow rectangular prism and stores the sheets P therein in a state where the sheets P are overlaid on each other with their surfaces facing the up/down direction, namely, in a state where the sheets P are stacked. Further, the sheet cassette 51 is configured to be attachable and detachable to/from the housing 2.

The pickup roller 52 is placed in contact with a part in the vicinity of a front edge of an uppermost surface of the sheets P stored in the sheet cassette 51. The feed roller 53 is arranged in front of and slightly separate from the pickup roller 52. The retard roller 54 is situated under the feed roller 53 and forms a gap corresponding to the thickness of one sheet P between the retard roller 54 and the feed roller 53.

When driving force is supplied from a non-illustrated sheet feed motor, the first sheet feed section 50 appropriately rotates or stops the pickup roller 52, the feed roller 53 and the retard roller 54. Accordingly, the pickup roller 52 sends out one or more uppermost sheets P, among the sheets P stored in the sheet cassette 51, forward. The feed roller 53 and the retard roller 54 send out one uppermost sheet P among the sheets P further forward while blocking second and lower sheets P. In this way, the first sheet feed section 50 successively sends out the sheets P forward while separating one sheet P from the stack of sheets P each time.

The conveyance guide 55 is arranged in a lower front part of the conveyance path W and makes the sheet P travel in a forward and upward direction and then in a rearward and upward direction along the conveyance path W. The conveyance roller pairs 56 and 57 are respectively arranged in the vicinity of a center and an upper end of the conveyance guide 55, supplied with driving force from the non-illustrated sheet feed motor, and rotate in prescribed directions. By the rotation, the conveyance roller pairs 56 and 57 make the sheet P travel along the conveyance path W.

Further, a second sheet feed section 60 is provided on the front side relative to the conveyance roller pair 57 in the housing 2. The second sheet feed section 60 is provided with a sheet tray 61, a pickup roller 62, a feed roller 63, a retard roller 64 and the like. The sheet tray 61 is formed in the form of a plate which is thin in the up/down direction and sheets P2 are set thereon. Incidentally, the sheets P2, different from the sheets P stored in the sheet cassette 51 in size and paper quality, for example, are set on the sheet tray 61.

The pickup roller 62, the feed roller 63 and the retard roller 64 are respectively configured similarly to the pickup roller 52, the feed roller 53 and the retard roller 54 in the first sheet feed section 50. When driving force is supplied from a non-illustrated sheet feed motor, the second sheet feed section 60 appropriately rotates or stops the pickup roller 62, the feed roller 63 and the retard roller 64 and thereby sends out one uppermost sheet P2 among the sheets P2 on the sheet tray 61 rearward while blocking second and lower sheets P2. In this way, the second sheet feed section 60 successively sends out the sheets P2 rearward while separating one sheet P2 from the stack of sheets P each time. The sheet P2 sent out is conveyed by the conveyance roller pair 57 along the conveyance path W similarly to the sheet P. For convenience of description, the sheet P2 is hereinafter referred to simply as the sheet P without distinguishing the sheet P2 from the sheet P.

Incidentally, the conveyance roller pair 57 is appropriately inhibited from rotating and applies frictional force to the sheet P to thereby correct the so-called skewing, that is, inclination of the side edges of the sheet P with respect to the traveling direction. After the edges of head end and tail end of the sheet P are oriented in the transverse direction, the conveyance roller pair 57 sends out the sheet P rearward. The conveyance roller pair 58 is situated at a position separate rearward from the conveyance roller pair 57 by prescribed spacing, rotates similarly to the conveyance roller pair 56 and the like, and thereby supplies driving force to the sheet P conveyed along the conveyance path W and makes the sheet P travel further rearward along the conveyance path W.

The secondary transfer section 49 (i.e., the backup roller 43 and the secondary transfer roller 46) of the intermediate transfer section 40 described above is arranged to the rear of the conveyance roller pair 58. The developer images formed in the image forming units 10 and transferred to the intermediate transfer belt 44 approach this secondary transfer section 49 due to the traveling of the intermediate transfer belt 44, and the prescribed bias voltage is applied to the secondary transfer roller 46. Accordingly, the secondary transfer section 49 transfers the developer images from the intermediate transfer belt 44 onto the sheet P conveyed thereto along the conveyance path W, and makes the sheet P travel further rearward.

Further, the image forming apparatus 1 includes a density sensor DS arranged on the lower rear side relative to the driven roller 42. The density sensor DS detects the density of each of the developers in the developer images transferred to the surface of the intermediate transfer belt 44 and notifies the print controller 3 of the obtained detection result. In response to the notification, the print controller 3 performs a density correction of correcting the density of each of the developers in the developer images of the respective colors formed in the respective image forming units 10 and performs feedback control on the bias voltage or the like of each component so that the density of each developer becomes equal to a desired value.

A fixation section 65 is arranged to the rear of the secondary transfer section 49. The fixation section 65 includes a heating part 66 and a pressing part 67 arranged to face each other across the conveyance path W. In the heating part 66, a heater for emitting heat, a plurality of rollers and the like are arranged inside a heating belt made of a hollow endless belt. The pressing part 67 is formed as a pressing roller in a cylindrical shape with its central axis extending in the transverse direction, and its top surface is pressed against a bottom surface of the heating part 66 to form a nip part.

According to the control by the print controller 3, the fixation section 65 heats the heater of the heating part 66 up to a prescribed temperature, makes the heating belt travel so as to rotate in the arrow R1 direction by appropriately rotating the rollers, and rotates the pressing part 67 in the arrow R2 direction. Then, upon receiving the sheet P onto which the developer images have been transferred by the secondary transfer section 49, the fixation section 65 sandwiches (i.e., nips) the sheet P between the heating part 66 and the pressing part 67, fixes the developer images to the sheet P by applying heat and pressure to the developer images, and sends out the sheet P rearward.

A conveyance roller pair 68 is arranged to the rear of the fixation section 65, and a switching section 69 is arranged to the rear of the conveyance roller pair 68. The switching section 69 switches the traveling direction of the sheet P to an upper side or a lower side according to the control by the print controller 3. A sheet ejection section 70 is provided above the switching section 69. The sheet ejection section 70 includes a conveyance guide 71 that guides the sheet P upward along the conveyance path W, conveyance roller pairs 72, 73, 74 and 75 respectively facing each other across the conveyance path W, and the like.

Further, a reconveyance section 77 is arranged under the switching section 69, the fixation section 65, the secondary transfer section 49, and the like. The reconveyance section 77 includes a conveyance guide, a conveyance roller pair (not shown) and the like that form a reconveyance path U. The reconveyance path U extends downward from the lower side of the switching section 69, eventually extends forward, and thereafter merges with the conveyance path W on a downstream side of the conveyance roller pair 57.

When ejecting the sheet P, the print controller 3 makes the switching section 69 switch the traveling direction of the sheet P to the sheet ejection section 70 side as the upper side. The sheet ejection section 70 conveys upward the sheet P received from the switching section 69 and ejects the sheet P to a sheet ejection tray 2T through an outlet port 76. When returning the sheet P, the print controller 3 makes the switching section 69 switch the traveling direction of the sheet P to the reconveyance section 77 side as the lower side. The reconveyance section 77 conveys the sheet P received from the switching section 69 to the reconveyance path U, eventually makes the sheet P reach the downstream side of the conveyance roller pair 57 so that the sheet P is conveyed along the conveyance path W again. By this operation, in the image forming apparatus 1, the sheet P with its surfaces flipped over is returned to the conveyance path W, and thus the so-called double-side printing can be executed.

As above, in the image forming apparatus 1, an image is printed (i.e., an image is formed) on the sheet P by forming the developer images by use of the developers in the image forming units 10, transferring the developer images onto the intermediate transfer belt 44, transferring the developer images from the intermediate transfer belt 44 onto the sheet P in the secondary transfer section 49, and fixing the developer images in the fixation section 65. For convenience of description, the developer image formed with the silver developer (brilliant developer) is hereinafter referred to also as a silver developer image (brilliant developer image), and the developer image formed with a color developer is hereinafter referred to also as a color developer image.

For example, when the image forming apparatus 1 successively transfers the silver developer image with the silver developer and the color developer images with the color developers to the intermediate transfer belt 44 at the image forming units 10, these developer images are transferred to the sheet P in the secondary transfer section 49. By this operation, the sheet P is brought into a state in which the color developer images have adhered to the surface of the sheet P and the silver developer image has been overlaid on the surface of the color developer images. In other words, the sheet P is brought into a state in which the color developer images have been arranged between the sheet P and the silver developer image to be in superimposition with the silver developer image.

In the following description, the color developer image formed with the black developer is referred to also as a black developer image, the color developer image formed with the yellow developer is referred to also as a yellow developer image, the color developer image formed with the magenta developer is referred to also as a magenta developer image, and the color developer image formed with the cyan developer is referred to also as a cyan developer image. Further, in the following description, a print process of superimposing the silver developer image on the black developer image is referred to as a brilliant superimposition print process, and a print obtained by the brilliant superimposition print process is referred to also as a silver black superimposition print. Furthermore, in the following description, a print process of forming the black developer image and the silver developer image without superimposing the silver developer image on the black developer image is referred to as a brilliant non-superimposition print process, and a print obtained by the brilliant non-superimposition print process is referred to also as a silver black non-superimposition print. Moreover, in the following description, a print process using the silver developer image alone is referred to as a silver developer print process, and a print obtained by the silver developer print process is referred to also as a silver print.

Incidentally, in the image forming apparatus 1, a formation amount (i.e., adhesion amount) of the developer in the developer image transferred onto the sheet P (hereinafter referred to as an on-medium formation amount, details will be described later) can be increased by increasing the absolute value of the bias voltage applied to each component by the control by the print controller 3, and the on-medium formation amount can be decreased by decreasing the absolute value of the bias voltage. Further, in the image forming apparatus 1, the on-medium formation amount in the developer image transferred onto the sheet P can be increased by increasing a print image density (details will be described later) of the developer by the control by the print controller 3, and the on-medium formation amount can be decreased by decreasing the print image density. Furthermore, in the image forming apparatus 1, the on-medium formation amount in the developer image transferred onto the sheet P can be increased by increasing transfer efficiency in the secondary transfer section 49 by the control by the print controller 3, and the on-medium formation amount can be decreased by decreasing the transfer efficiency.

1-2. Control Configuration of Image Forming Apparatus

Figure 3:
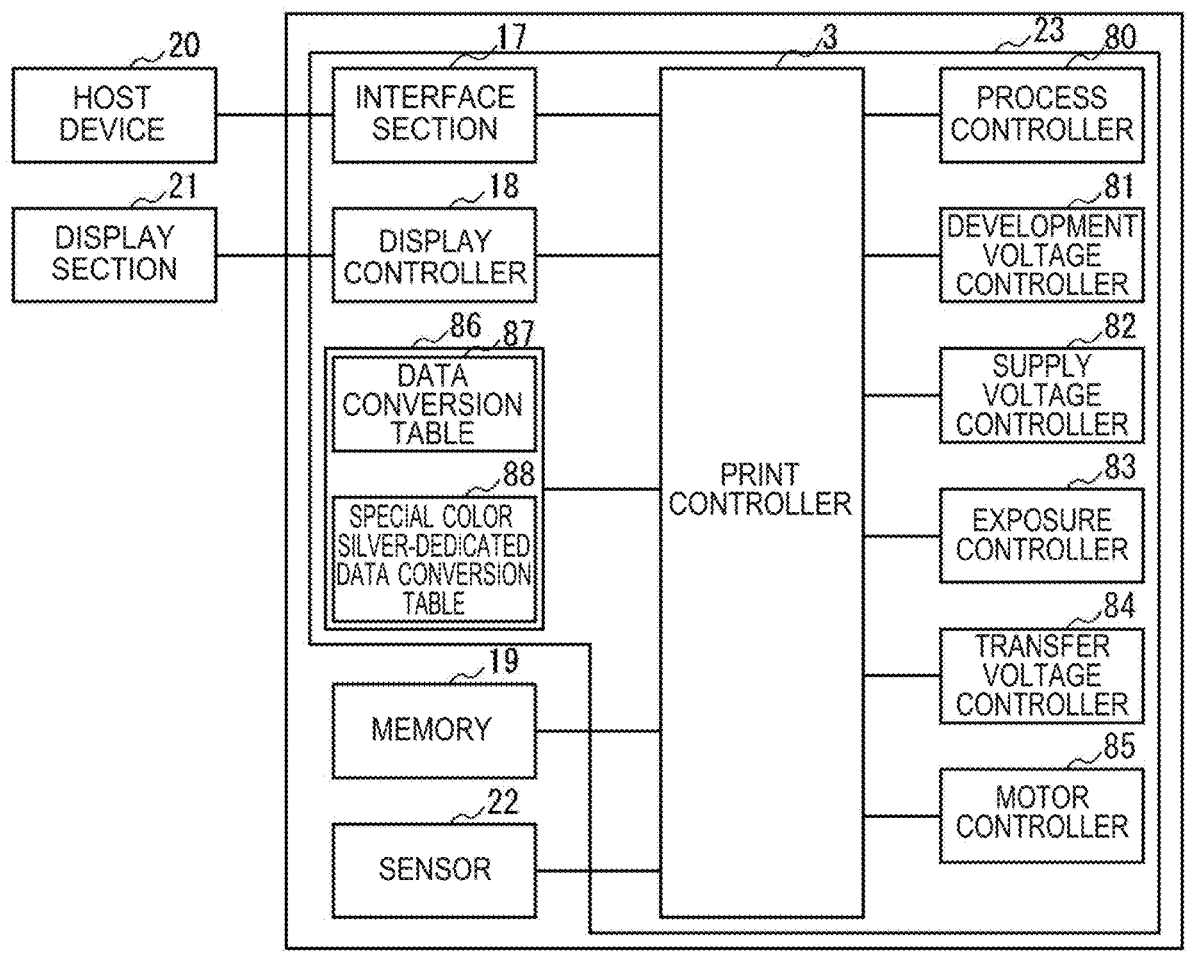
FIG. 3 is a block diagram showing a control configuration of the image forming apparatus.

As shown in FIG. 3, the image forming apparatus 1 includes a CPU 23, a memory 19 and a sensor 22. The CPU 23 includes the print controller 3, an interface section 17, a display controller 18, a process controller 80, a development voltage controller 81, a supply voltage controller 82, an exposure controller 83, a transfer voltage controller 84, a motor controller 85 and a data presence/absence judgment section 86.

The print controller 3 controls the entire operation of the image forming apparatus 1. The interface section 17 receives print data transmitted from the host device 20 such as computer equipment, for example, and provides the print data to the print controller 3. The display controller 18 controls display condition of a display section 21 based on a command signal from the print controller 3.

The process controller 80 controls voltage of each component in the image forming unit 10 and the like. The development voltage controller 81 controls the bias voltage of the development roller 34. The supply voltage controller 82 controls the bias voltages of the first supply roller 32, the second supply roller 33 and the development blade 35. The exposure controller 83 controls the lighting and extinction of LEDs of the LED heads 14. The transfer voltage controller 84 controls the bias voltage of the primary transfer roller 45. The motor controller 85 rotates the photosensitive drums 36 and the like respectively in prescribed directions.

The data presence/absence judgment section 86 analyzes the print data transmitted from the host device 20 and received by the interface section 17 and judges whether or not there exists image data to be printed by the image forming units 10.

The data presence/absence judgment section 86 includes a data conversion table 87. The data conversion table 87 is a table for converting the received print data into print patterns of the image forming units 10K, 10C, 10M, 10Y and 10S. For example, when print data of a color represented as red 100[%] in the RGB output is received from commercially available image generation software, the data presence/absence judgment section 86 judges that the print data is image data to be printed with magenta (M) 100[%] and yellow (Y) 100[%] according to conversion formulas included in the data conversion table 87.

This data presence/absence judgment section 86 further includes a special color silver-dedicated data conversion table 88. The special color silver-dedicated data conversion table 88 as a storage section is a table used when printing print data of the silver color and is used for converting the received print data into print patterns of the image forming units 10K and 10S. The special color silver-dedicated data conversion table 88 includes information that associates the type of the sheet P with surface roughness and sheet thickness of the sheet P. Further, the special color silver-dedicated data conversion table 88 includes information that associates the surface roughness of the sheet P with print patterns differing from each other in an overlap rate (explained later) and information that associates the sheet thickness of the sheet P with print patterns differing from each other in the overlap rate (explained later). For example, when print data of a color represented as silver 100[%] is received, the data presence/absence judgment section 86 judges that the print data is image data to be printed in a print pattern PT1 shown in FIG. 5, a print pattern PT301 shown in FIG. 12 or a print pattern PT101 shown in FIG. 6 by use of black (K) and silver (S) depending on the type of the sheet to be printed on according to conversion formulas included in the special color silver-dedicated data conversion table 88.

The memory 19 includes the aforementioned ROM and RAM and stores information indicating a procedure of a print operation and a variety of information (for example, software program) such as calculation formulas for making various corrections. The sensor 22 detects the position of the sheet P, the temperature, the humidity and the like.

1-3. Manufacture of Developer

Next, the manufacture of the developers stored in the developer containers 12 of the image forming units 10 (FIG. 2) will be described below. As the developers of black, yellow, magenta and cyan, commercially available developers for the image forming apparatus 1 (C941dn: manufactured by Oki Electric Industry Co., Ltd.) were used. In this embodiment, the silver developer was used as the developer of the special color. In the following description, the manufacture of the developer of silver (silver color) will be described.

In general, the developer contains not only the pigment for developing a desired color but also a binder resin for binding the pigment to the medium such as the sheet P, an external additive for improving the property of being electrically charged, and the like. For convenience of description, particles including the pigment and the binder resin or powdery matter as an aggregate of the particles are/is hereinafter referred to as a toner or toner particles, and powdery matter containing an external additive or the like in addition to the toner is hereinafter referred to as the developer. Incidentally, since the description in this embodiment is given of a single component development method, particles including the brilliant pigment and the binder resin or powdery matter as an aggregate of the particles are/is referred to as a brilliant toner or brilliant toner particles, and powdery matter containing an external additive or the like in addition to the brilliant toner is defined as the brilliant developer.

However, in description of a two-component development method, particles including the brilliant pigment and the binder resin or powdery matter as an aggregate of the particles are/is referred to as a brilliant toner or brilliant toner particles, and powdery matter containing an external additive in addition to the brilliant toner is defined as the brilliant developer.

1-3-1. Example 1 and Example 2

In an example 1 and an example 2, an aqueous medium in which an inorganic dispersant has been dispersed is produced first. Specifically, 600 parts by weight of industrial trisodium phosphate dodecahydrate is mixed with 18,400 parts by weight of pure water and dissolved in the pure water at a solution temperature of 60 [° C.], and thereafter dilute nitric acid for pH (hydrogen ion exponent) adjustment is added. Into this aqueous solution, a calcium chloride aqueous solution obtained by dissolving 300 parts by weight of industrial calcium chloride anhydride in 2,600 parts by weight of pure water is poured, and the solution is stirred at high speed for 50 minutes by using a line mill (manufactured by Primix Corporation) at a revolution speed of 3566 [rpm] while maintaining the solution temperature at 60 [° C.]. By this process, an aqueous phase as an aqueous medium in which a suspension stabilizer (inorganic dispersant) has been dispersed is prepared.

Further, in the example 1, a material-dispersed oily medium is produced. Specifically, a pigment dispersion solution is produced by mixing 470 parts by weight of the brilliant pigment (volume mean particle diameter: 5.4 [μm]) and 23 parts by weight of a charge control agent (BONTRON E-84: manufactured by Orient Chemical Industries Co., Ltd.) with 7,000 parts by weight of ethyl acetate. In the pigment dispersion solution, the brilliant pigment contains minute flakes (i.e., small pieces formed like flat plates, flattened objects or scales and each having a planar part) of aluminum (Al). In the following description, this brilliant pigment is referred to also as an aluminum pigment or a metallic pigment. Incidentally, the volume mean particle diameter is referred to also as a volume particle diameter, a volume median diameter or a mean median diameter. Parenthetically, while the brilliant pigment with the volume mean particle diameter of 5.4 [μm] was used in this example, it is sufficient that the volume mean particle diameter of the brilliant pigment is in a range of 5.3 [μm] to 5.7 [μm].

Thereafter, the pigment dispersion solution is stirred while maintaining the solution temperature at 60 [° C.], 175 parts by weight of ester wax (WE-4: manufactured by NOF Corporation) as a release agent and 1,670 parts by weight of polyester resin as a binder resin are put into the pigment dispersion solution, and the solution is stirred until solid matter disappears. By this process, an oil phase as a pigment-dispersed oily medium is prepared.

Subsequently, the oil phase is poured into the aqueous phase whose solution temperature has been lowered to 55 [° C.], and a suspension is formed by stirring the mixture of the oil phase and the aqueous phase for five minutes at a revolution speed of 1000 [rpm] as a particle formation condition, by which particles are formed in the suspension. Subsequently, slurry containing the developer is formed by removing ethyl acetate from the suspension by distilling the suspension under reduced pressure. Subsequently, pH (hydrogen ion exponent) is lowered to 1.6 or less by adding nitric acid to the slurry, the slurry is stirred, tricalcium phosphate as a suspension stabilizer is dissolved in the slurry, and the slurry is dehydrated, by which the developer is formed. Subsequently, a water rinse is carried out by redispersing the dehydrated developer in pure water and stirring the solution. Thereafter, toner base particles are produced by executing a dehydration process, a drying process and a classification process.

Into the toner base particles produced as above, 1.5 [wt. %] of small silica (RY200: manufactured by Nippon Aerosil Co., Ltd.), 2.29 [wt. %] of colloidal silica (X24-9163A: manufactured by Shin-Etsu Chemical Co., Ltd.) and 0.37 [wt. %] of melamine particles (Epostar S: manufactured by Nippon Shokubai Co., Ltd.) are mixed as an external additive process, by which the silver developer with a volume mean particle diameter of 15.01 [μm] is obtained. Incidentally, while the silver developer with the volume mean particle diameter of 15.01 [μm] was used in this example, it is sufficient that the volume mean particle diameter of the silver developer is in a range of 15.01±3.00 [μm].

In this example, the volume mean particle diameter of each developer was measured by using a precision particle size distribution measurement device Multisizer 3 (manufactured by Backman Coulter Inc.). Measurement conditions were as follows:
aperture diameter: 100 [μm]
electrolytic solution: Isoton II (manufactured by Backman Coulter Inc.)
dispersion solution: Neogen S-20F (manufactured by DKS Co., Ltd.) was dissolved in the aforementioned electrolytic solution and the concentration was adjusted to 5[%]

In this example, 10-20 [mg] of a measurement sample was added to 5 [mL] of the aforementioned dispersion solution and dispersed for 1 minute by using an ultrasonic disperser, thereafter 25 [mL] of the electrolytic solution was added to the solution and dispersed for 5 minutes by using the ultrasonic disperser, and coagulation was removed by using mesh with 75 [μm] apertures, by which a sample dispersion solution was prepared.

Further, in this example, this sample dispersion solution was added to 100 [mL] of the aforementioned electrolytic solution, distribution (i.e., volume particle size distribution) was obtained by measuring 30,000 particles by using the aforementioned precision particle size distribution measurement device, and the volume mean particle diameter (Dv50) was obtained based on the volume particle size distribution.

Incidentally, the volume mean particle diameter (Dv50) means a certain particle diameter when the number or mass of particles larger than the certain particle diameter occupies 50[%] of the number or mass of particles of the whole powdery matter in the particle diameter distribution of the powdery matter. The aforementioned precision particle size distribution measurement device measures the particle size distribution based on the Coulter principle. This Coulter principle, which is referred to as an aperture electric resistance method, is a method of measuring the volume of a particle by feeding a constant electric current through an aperture (small cavity) in an electrolyte solution and measuring the change in the electric resistance of the aperture when the particle passes through the aperture.

1-4. Print Patterns in Example 1

Next, the print patterns in the example 1 will be described below.

1-4-1. Example 1-1

Figure 4:
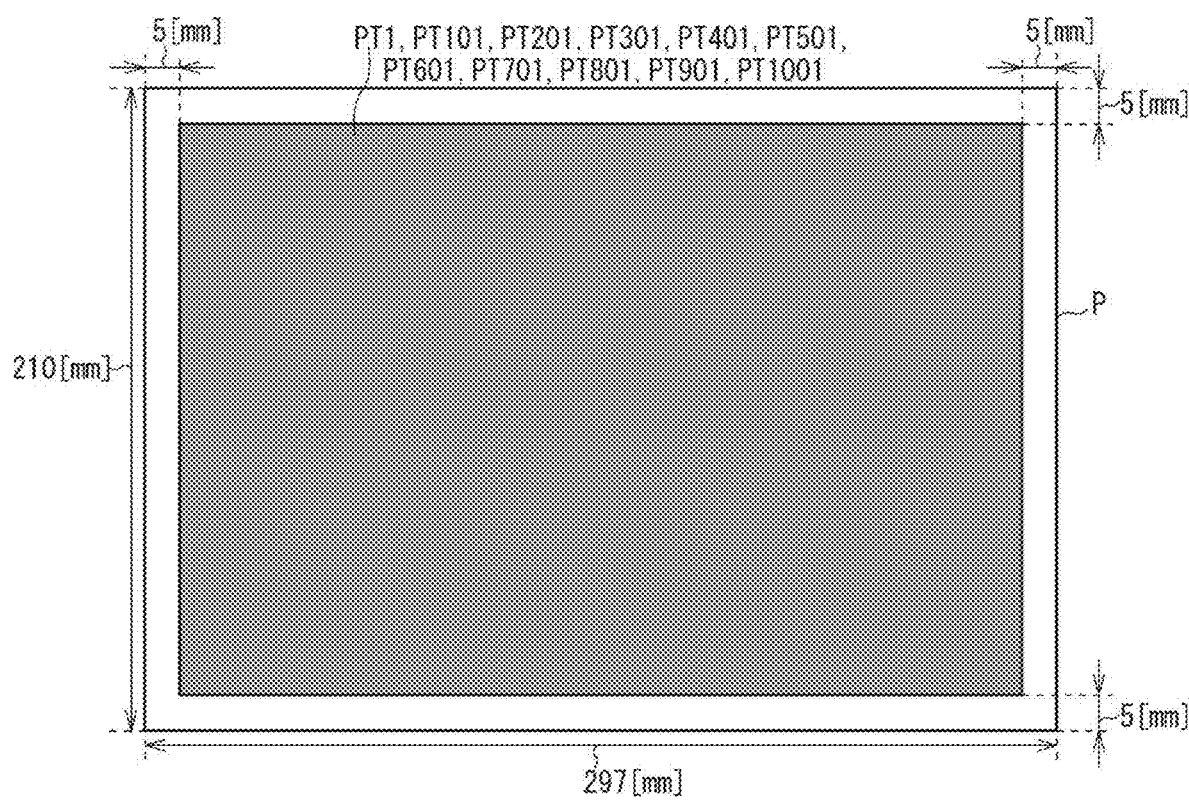
FIG. 4 is a diagram showing a print pattern.

The print pattern PT1 in an example 1-1 is a print pattern formed on the sheet P as shown in FIG. 4 when print data specifying an image pattern (so-called solid image) with a special color (silver) print image density 100[%] in the whole region of an A4 sheet P is transmitted from the host device 20 to the image forming apparatus 1 and the image forming apparatus 1 executes the brilliant non-superimposition print process by using the special color silver-dedicated data conversion table 88.

Figure 5:
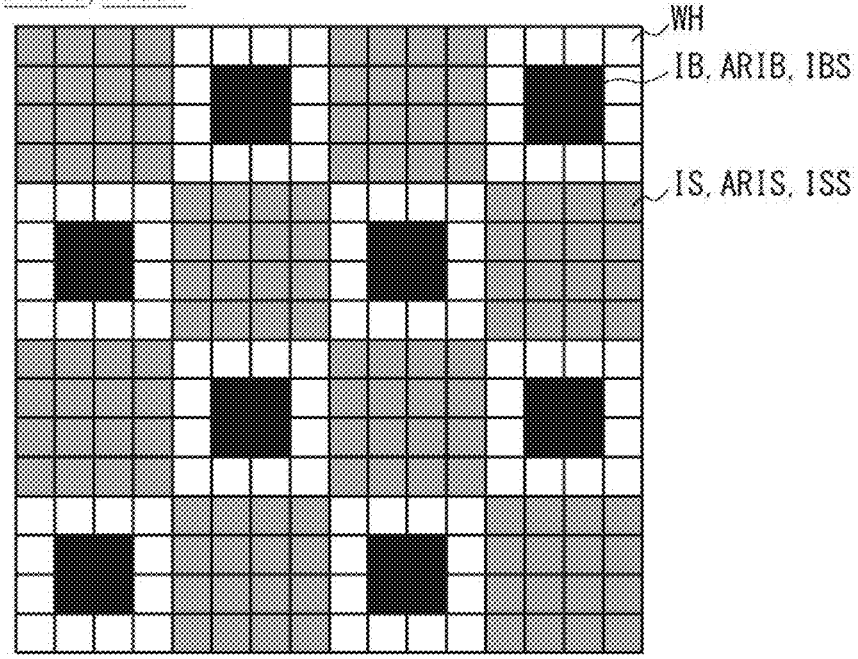
FIG. 5 is an enlarged view showing print patterns in an example 1-1, an example 2-1, an example 3-1 and an example 4-1.

In this case, the image forming apparatus 1 refers to the previously stored special color silver-dedicated data conversion table 88 and thereby converts the print data specifying special color (silver) 100[%] to a command for printing on the sheet P with black and the special color in the 16×16 dot range as shown in FIG. 5 which is a part of the print pattern PT1 shown in FIG. 4. Here, one dot (referred to also as one pixel unit) means a state in which the print pattern PT1 has been magnified up to a minimum unit of the print command. The print pattern PT1 is formed of dots of 600 [dpi], and the smallest quadrangle in FIG. 5 corresponds to one dot. Since the print pattern PT1 is in 600 [dpi], width and height of one dot are 0.042 [mm]. As above, in the case of the example 1-1, there is obtained a silver-black non-superimposition print as a print made by laying the print pattern PT1 (whose enlarged view is shown in FIG. 5) throughout the whole region of the A4 sheet P as shown in FIG. 4.

The print pattern PT1 is made up of a silver developer image IS formed with the silver developer and a black developer image IB formed with the black developer. In the following description, a region on the sheet corresponding to the silver developer image IS is referred to as a silver developer image region ARIS, and a region on the sheet corresponding to the black developer image IB is referred to as a black developer image region ARIB.

In the silver developer image IS, silver developer image squares ISS each in a 4×4 dot square shape are arranged in a grid, with 4-dot spacing between ones vertically or horizontally adjoining each other. In the black developer image IB, black developer image squares IBS each in a 2×2 dot square shape are respectively arranged between adjoining silver developer image squares ISS. Between a black developer image square IBS and its adjoining silver developer image squares ISS, a white color region WH as a region where no developer image is formed so as to surround the periphery of the black developer image square IBS dot by dot for one turn. Namely, each black developer image square IBS is arranged while securing the white color region WH as a blank part between the black developer image square IBS and its adjoining silver developer image squares ISS. Incidentally, when the black developer image square IBS is printed on the sheet P, the black developer image square IBS in reality does not form the perfect 2×2 dot square shape but four dots somewhat overlap with each other and their corners are rounded.

As above, in the print pattern PT1, the black developer image region ARIB is arranged in a region other than the silver developer image region ARIS in the state in which the white color regions WH are formed between the black developer image region ARIB and the silver developer image region ARIS. Further, in the print pattern PT1, as viewed in a 16×16 dot range, for example, the silver developer image IS is formed for 128 dots as the number of dots corresponding to ½ of the whole of the 16×16 dot region, and the black developer image IB and the white color regions WH are formed in the remaining region. Furthermore, in the print pattern PT1, as viewed in the 16×16 dot range, for example, the silver developer image IS is formed for 128 dots, and the black developer image IB is formed for 32 dots. Therefore, in the print pattern PT1, the silver developer image region ARIS is formed to be larger than the black developer image region ARIB. Namely, in the print pattern PT1, occupancy area ratio of the silver developer image region ARIS is larger than occupancy area ratio of the black developer image region ARIB in the 16×16 dot range.

1-4-2. Example 1-2

Figure 6:
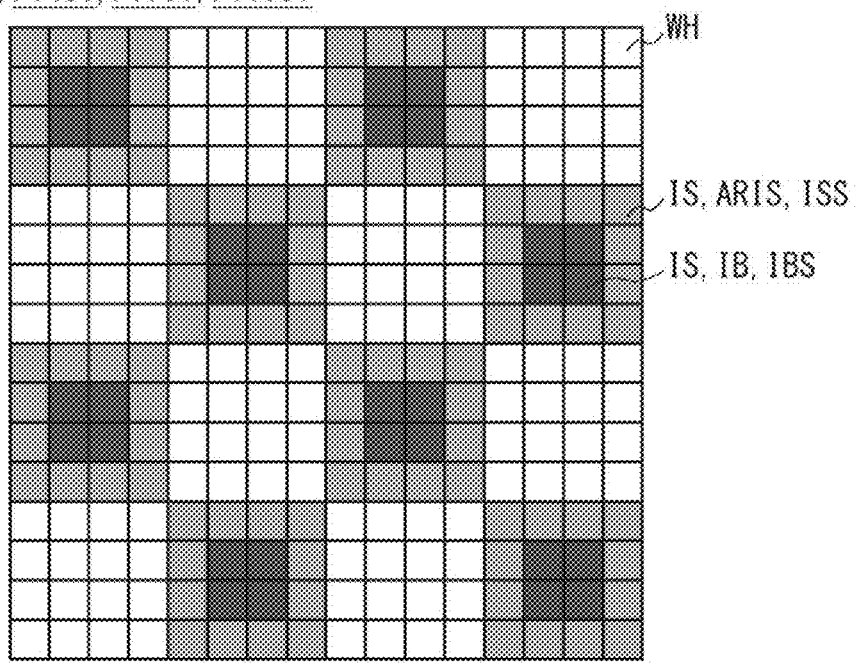
FIG. 6 is an enlarged view showing print patterns in an example 1-2, an example 2-3, an example 3-2 and an example 4-3.

The print pattern PT101 in an example 1-2 is a print pattern formed on the sheet P as shown in FIG. 4 by the image forming apparatus 1 by using the special color silver-dedicated data conversion table 88 when print data specifying the solid image of the special color (silver) in the whole region of the A4 sheet P is transmitted from the host device 20 to the image forming apparatus 1. In the case of the example 1-2, there is obtained a print made by laying the print pattern PT101 (whose enlarged view is shown in FIG. 6) throughout the whole region of the A4 sheet P as shown in FIG. 4.

In the print pattern PT101, each black developer image square IBS has moved to a central part of a silver developer image square ISS in comparison with the print pattern PT1 (FIG. 5). Therefore, the whole region of the black developer image square IBS overlaps with a silver developer image square ISS. The image forming apparatus 1 prints the black developer image IB as a solid image of the black developer under the silver developer image IS as a solid image of the silver developer. By executing the brilliant superimposition print process, regions where a black developer image square IBS and a silver developer image square ISS overlap with each other are formed.

As above, in the case of the example 1-2 in comparison with the example 1-1, although the image forming apparatus 1 in response to the print data specifying the silver solid image forms the silver developer image IS, the black developer image IB and the white color regions WH similarly to the example 1-1 by using the special color silver-dedicated data conversion table 88, the image forming apparatus 1 forms the print pattern PT101 as an arrangement pattern of the silver developer image IS, the black developer image IB and the white color regions WH different from that in the example 1-1.

1-4-3. Print Image Density

Here, the print image density is a value representing the ratio of the number of pixels where the developer is transferred onto the sheet P to the total number of pixels when the image is analyzed in units of pixels. For example, 100[%] area ratio printing in cases of performing full-page solid color printing on a printable range in a prescribed region (corresponding to one turn of the photosensitive drum 36, one page of the print medium, or the like) is described as 100[%] print image density, and printing corresponding to a 1[%] area relative to the 100[%] print image density is described as 1[%] print image density. When the print image density DPD is represented as a numerical expression by using a used dot count Cm, a rotation count Cd and a total dot count CO, the print image density DPD can be represented as the following expression (1):

$$DPD = \frac{C_m}{Cd \times CO} \times 100[\%] \quad (1)$$

Incidentally, the used dot count Cm is the number of dots actually used for forming the image while the photosensitive drum 36 rotates Cd times, that is, the total number of dots exposed by the LED head 14 (FIG. 2) while the image is formed. The total dot count CO is the total number of dots per rotation of the photosensitive drum 36 (FIG. 2), that is, the total number of dots potentially usable in one rotation of the photosensitive drum 36 when forming the image irrespective of the presence/absence of the exposure. In other words, the total dot count CO is the total number of dots used in the formation of a solid color image (solid image) performed by transferring the developer onto all the pixels. Therefore, the value (Cd×CO) indicates the total number of dots potentially usable when forming the image while the photosensitive drum 36 rotates Cd times.

1-5. Measurement and Evaluation of Developers

Next, measurement and evaluation of the developers will be described below. For the measurement and evaluation of the developers, prescribed images were printed on the sheets P by the image forming apparatus 1 (FIG. 1) by using the developers, and the measurement and evaluation were performed in regard to a tint, luster, texturedness, and luster irregularity.

In this evaluation, the silver developer was stored in the developer container 12 (FIG. 2) of the image forming unit 10S corresponding to the special color and the black developer was stored in the developer container 12 (FIG. 2) of the image forming unit 10K corresponding to the black in the image forming apparatus 1 (C941dn: manufactured by Oki Electric Industry Co., Ltd.) (FIG. 1), the print processes of the example 1-1 and the example 1-2 were executed, and the evaluation was performed in regard to the tint, the luster, the texturedness and the luster irregularity.

Specifically, in this evaluation, coat paper (OS coat paper W, 127 [g/m$^2$]: manufactured by Fuji Xerox Co., Ltd.), high-quality paper (Excellent White, 80 [g/m$^2$]: manufactured by Oki Electric Industry Co., Ltd.) and plain paper (Data Copy, 80 [g/m$^2$]: manufactured by M-Real Corp.) were used as three types of sheets P. The evaluation was performed by adjusting the development bias voltage so that the on-medium formation amount (on-sheet adhesion amount) of the silver developer equals 0.65 [mg/cm$^2$].

1-5-1. Measurement of Smoothness

Here, measurement of smoothness of the sheet P will be described below. In this measurement, the smoothness of the sheet surface was measured by measuring 10-point mean roughness Rz [μm] of the three types of sheets P in a 300 [μm] by 300 [μm] square region by using a super-depth shape measurement microscope (VK-8500: manufactured by Keyence Corporation) at a magnification of 50 times. The smoothness of the sheet P indicates the roughness of the sheet P, and a sheet P having high smoothness can be regarded as a sheet P having low roughness.

Of two or more kinds of sheets P having different smoothness, a sheet P having higher smoothness is also referred to as a first medium, and a sheet P having a lower smoothness is also referred to as a second medium.

1-5-2. Measurement of On-Medium Formation Amount

Here, measurement of the on-medium formation amount will be described below. In this measurement, the on-medium formation amount of the silver developer before the fixation was measured. Here, the amount of adhesion of the developer to the medium such as the sheet P is represented as weight [mg] per 1 [cm$^2$] as a unit area, and the unit of the adhesion amount is [mg/cm$^2$]. This amount is hereinafter referred to as the on-medium formation amount. Namely, the on-medium formation amount is an index indicating to what extent the developer has adhered to the sheet P. This on-medium formation amount is measured and calculated by the following method.

First, a jig made of metal and having a planar part is prepared, and double-stick tape is stuck on a part having an area of 1 [cm$^2$] in the planar part of the jig. In this state, the weight of the jig is measured by using an electronic balance (CAP225D: manufactured by Sartorius Japan K.K.), and thereafter DC voltage of +300 [V] is applied to the jig by using an external power supply.

Figure 7:
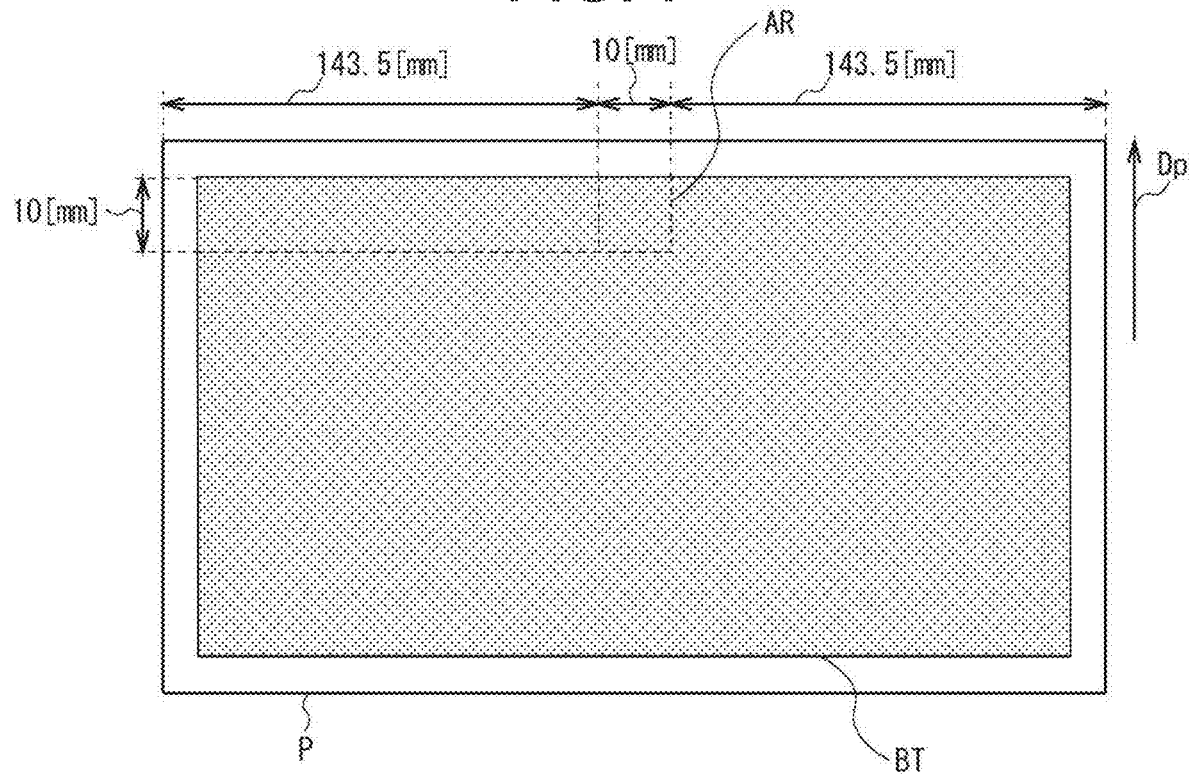
FIG. 7 is a diagram showing a measurement region of a developer in an image pattern.

Subsequently, media (namely, sheets P (the coat paper (OS coat paper W, 127 [g/m$^2$]: manufactured by Fuji Xerox Co., Ltd.), the high-quality paper (Excellent White, 80 [g/m$^2$]: manufactured by Oki Electric Industry Co., Ltd.) and the plain paper (Data Copy, 80 [g/m$^2$]: manufactured by M-Real Corp.))) onto which an image pattern BT (i.e., developer image) has been transferred as shown in FIG. 7 are prepared. In regard to each of these sheets P, the developer on the medium is collected by pressing the jig once against a 10 [mm] by 10 [mm] region (hereinafter referred to as a measurement region AR) situated substantially at the center of the medium in regard to a main scanning direction and in the vicinity of the head end in regard to a medium conveyance direction Dp (i.e., auxiliary scanning direction). Incidentally, the length of the sheet P in the main scanning direction (horizontal direction in FIG. 7) is 297 [mm], which is equivalent to the long side of the A4 size or the short side of the A3 size. Subsequently, the weight of the jig with the developer adhering thereto is measured again by using the electronic balance. Thereafter, the on-medium formation amount [mg/cm$^2$] is calculated by calculating the increment in the weight of the jig before and after the collection of the developer. For convenience of illustration, the image pattern BT in FIG. 7 is hatched with dots.

When measuring a silver developer on-medium formation amount as the on-medium formation amount of the silver developer, the print process of the image pattern BT (so-called solid image) in which the print image density of the silver developer is set at 100[%] is executed by the image forming apparatus 1 (C941dn: manufactured by Oki Electric Industry Co., Ltd.) (FIG. 1), and the silver developer on the medium is collected by pressing the jig against the image pattern BT once. Further, the image forming apparatus 1 adjusts the silver developer on-medium formation amount by varying the bias voltage applied to the development roller 34 to 110-335 [V].

1-5-3. Measurement and Evaluation of Tint

In this evaluation, a luminous reflectance difference ΔY as a measurement value representing the tint (grayishness) of the silver color on the sheet was measured by using a spectrophotometric colorimeter (CM-2600d, measurement diameter Φ=8 [mm]: manufactured by Konica Minolta, Inc.). The luminous reflectance difference ΔY is the difference between the luminous reflectance in a state of blank paper and the luminous reflectance of the print image. Specifically, the luminous reflectance difference ΔY was measured by subtracting the luminous reflectance of the medium before the printing from the luminous reflectance of the medium after the printing. Further, the coat paper (OS coat paper W, 127 [g/m²]: manufactured by Fuji Xerox Co., Ltd.) as a medium before the printing was used as an underlay for the print at the time of the measurement. In this measurement, a light source condition C, an angle 2 [°], and a regular reflection light processing method SCE were employed.

Here, as a characteristic of the silver developer, the silver developer is capable of not only exhibiting its own brilliance on the print but also expressing the grayishness it has as a color tone. However, when the luminous reflectance difference ΔY is less than 30 and is too small, namely, when the color tone is similar to that of the original medium, the grayish color tone disappears and it becomes impossible to express the grayishness. On the other hand, when the luminous reflectance difference ΔY exceeds 36 and is too great, the color becomes too dark and a blackish color tone becomes too strong, and it similarly becomes impossible to express the grayishness. Therefore, in this evaluation, the expressing of the grayishness of the silver developer after the printing is considered to be successful when the luminous reflectance difference ΔY is greater than or equal to 30 and less than or equal to 36. Accordingly, the luminous reflectance difference ΔY was measured at three measurement positions in the whole region of the A4 sheet P, a mean value of the measured luminous reflectance differences ΔY was calculated, and the tint was judged to be excellent when the mean value of the luminous reflectance differences ΔY was greater than or equal to 30 and less than or equal to 36.

1-5-4. Measurement and Evaluation of Luster

Figure 8:
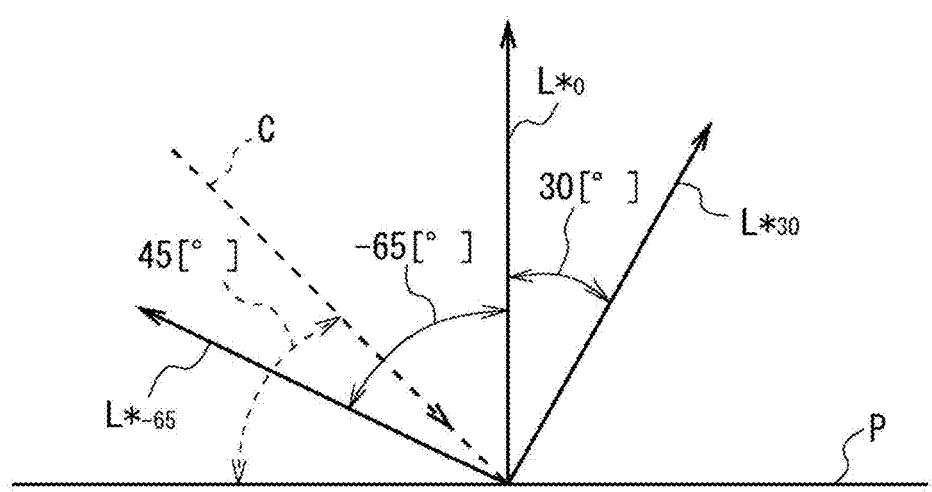
FIG. 8 is a diagram showing light irradiation and light reception by a goniophotometer.

Next, in this evaluation, the brilliance was measured by using a goniophotometer (GC-5000L: manufactured by Nippon Denshoku Industries Co., Ltd.). Specifically, as shown in FIG. 8, the goniophotometer irradiated the sheet P with a light beam C from a 45 [°] direction with respect to the surface of the sheet P, and received reflected light at directions of 0 [°], 30 [°] and −65 [°] with respect to a vertical direction to the sheet P. Then, a lightness index $L*_0$, a lightness index $L*_{30}$ and a lightness index $L*_{-60}$ were calculated respectively based on the obtained light reception results. Subsequently, in this evaluation, the brilliance of the image was measured by calculating a flop index FI by substituting each of the calculated lightness indices into the following expression (2):

$$FI = 2.69 \times \frac{(L_{*30} - L_{*-65})^{1.11}}{(L_{*0})^{0.86}} \quad (2)$$

This flop index FI (FI value) is an index representing the luster, and indicates high brilliance when its value is high and indicates low brilliance when its value is low. Here, when the FI value is greater than or equal to 8.0, a person viewing the print feels metallic luster occurring on the print. Therefore, in this evaluation, the brilliance is considered to have been obtained sufficiently when the FI value is greater than or equal to 8.0. Accordingly, the FI value at a printing central part was measured and the luster was judged to be excellent when the FI value was greater than or equal to 8.0.

1-5-5. Evaluation of Texturedness and Luster Irregularity

Next, in this evaluation, the texturedness and the luster irregularity on the sheet surface were evaluated. In this evaluation, the texturedness and the luster irregularity were judged by visually observing the obtained print. The texturedness means a state in which thin hairlines in parallel with the main scanning direction appear in the print result and the surface of the sheet P looks textured. The luster Irregularity means a state in which lustrous parts and non-lustrous parts are scattered about in the print result in a patchy condition. In this evaluation, the texturedness was judged to be excellent (satisfactory) when no texturedness was found on the print, and the luster Irregularity was judged to be excellent (satisfactory) when no luster Irregularity was found on the print.

1-6. Measurement Result and Evaluation Result

In the following, a description will be given of the result of the evaluation tests for checking the effects of the examples and of effects understandable from the result.

As shown in FIG. 9, when the black developer image IB and the silver developer image IS were not overlapped (superimposed) as in the example 1-1, on media with high smoothness and low undulations (10-point mean roughness Rz=2.4 [μm]) like the coat paper, the tint (luminous reflectance difference ΔY) and the luster level (FI value) were excellent, no texturedness or luster irregularity of the printing was found, and the judgment results were excellent without the need of overlapping the black developer image IB and the silver developer image IS with each other. However, in the case of the example 1-1, the texturedness was not excellent on media with relatively low smoothness and relatively high undulations (10-point mean roughness Rz=15.3 [m]) like the high-quality paper. Further, in the case of the example 1-1, the luster level and the texturedness and the luster irregularity of the printing were not excellent on media with low smoothness and high undulations (10-point mean roughness Rz=26.5 [in]) like the plain paper.

As shown in FIG. 10, when the black developer image IB and the silver developer image IS were overlapped as in the example 1-2, on media with low smoothness and high undulations (10-point mean roughness Rz≥15.3 [μm]) like the high-quality paper and the plain paper, the tint and the luster level were excellent, no texturedness or luster irregularity of the printing was found, and the judgment results were excellent. However, in the case of the example 1-2, the tint was not excellent on media with high smoothness and low undulations (10-point mean roughness Rz=2.4 [μm])

like the coat paper. It can be considered that an increase in the area of concealment of the black developer image IB on the coat paper by the silver developer image IS lead to a decrease in the luminous reflectance difference $\Delta Y$.

Based on the above results, in the image forming apparatus 1, a threshold value of the 10-point mean roughness Rz for judging between media with high smoothness and media with low smoothness was set at 15.3 [µm]. Further, the image forming apparatus 1 was set so as to form the black developer image IB and the silver developer image IS on a medium without overlapping them with each other when the medium has high smoothness and the 10-point mean roughness Rz less than the threshold value 15.3 [µm] like the coat paper, and to form the black developer image IB and the silver developer image IS on a medium while superimposing the silver developer image IS on the black developer image IB when the medium has low smoothness and the 10-point mean roughness Rz greater than or equal to the threshold value 15.3 [µm] like the high-quality paper and the plain paper. With these settings, the image forming apparatus 1 is capable of obtaining an excellent print with excellent tint and luster and no texturedness or luster irregularity of the printing.

In this regard, when the black developer TB is not arranged under the silver developer TS as in the example 1-1 in cases of a sheet P with high smoothness as shown in FIG. 11(A), the silver developer TS is unlikely to enter a concave part DP of the sheet P since the concave part DP is shallow, and light applied to the silver developer TS undergoes regular reflection as indicated by the solid line in FIG. 11(A). Accordingly, when the smoothness of the sheet P is high, the orientation of the brilliant pigment does not deteriorate, and the luster, the texturedness and the luster irregularity become excellent.

On the other hand, when the black developer TB is not arranged under the silver developer TS as in the example 1-1 in cases of a sheet P with low smoothness as shown in FIG. 11(B), the silver developer TS enters a concave part DP of the sheet P since the concave part DP is deep, and light applied to the silver developer TS undergoes irregular reflection as indicated by the broken line in FIG. 11(B). Accordingly, when the smoothness of the sheet P is low, it can be considered that the orientation of the brilliant pigment deteriorated and that affected the luster, the texturedness and the luster irregularity.

In contrast, when the black developer TB is arranged under the silver developer TS as in the example 1-2 in cases of a sheet P with low smoothness as shown in FIG. 11(C), the black developer TB enters concave parts DP of the sheet P and fills in the undulations of the sheet P, and thus the silver developer TS becomes unlikely to enter the concave part DP and light applied to the silver developer TS undergoes regular reflection. Accordingly, when the black developer TB is arranged under the silver developer TS as in the example 1-2 in cases where the smoothness of the sheet P is low, the orientation of the brilliant pigment of the silver developer TS arranged over the black developer TB does not deteriorate, and the luster, the texturedness and the luster irregularity become excellent.

1-7. Print Patterns in Example 2

Next, the print patterns in the example 2 will be described below.

1-7-1. Example 2-1

As shown in FIG. 4 and FIG. 5, a print pattern PT201 in an example 2-1 is the same as the print pattern PT1 in the example 1-1. In the print pattern PT1, the black developer image IB does not overlap with the silver developer image IS. Therefore, it can also be said that 0[%] of the area of the black developer image IB overlaps with the silver developer image IS in the print pattern PT1. In the following description, a state in which the black developer image IB does not overlap with the silver developer image IS as in the print pattern PT201 is referred to also as an overlap rate 0[%] as a superimposition ratio. Incidentally, in this embodiment, the superimposition ratio is defined as ratio of the area of the silver developer image region ARIS formed in the black developer image region ARIB. Namely, the superimposition ratio represents occupancy ratio of the area of the silver developer image region ARIS overlapping with the black developer image region ARIB to the area of the whole of the black developer image region ARIB. In other words, the superimposition ratio can also be expressed as ratio for which a formation region of the black developer image IB formed on the intermediate transfer belt 44 as a medium or the sheet P as a medium overlaps with a formation region of the silver developer image IS. 0[%] of the area of the black developer image IB overlaps with the silver developer image IS. In the following description, such a state in which 0[%] of the area of the black developer image IB overlaps with the silver developer image IS as in the print pattern PT201 is referred to also as an overlap rate 0[%] as a superimposition ratio.

1-7-2. Example 2-2

Figure 12:
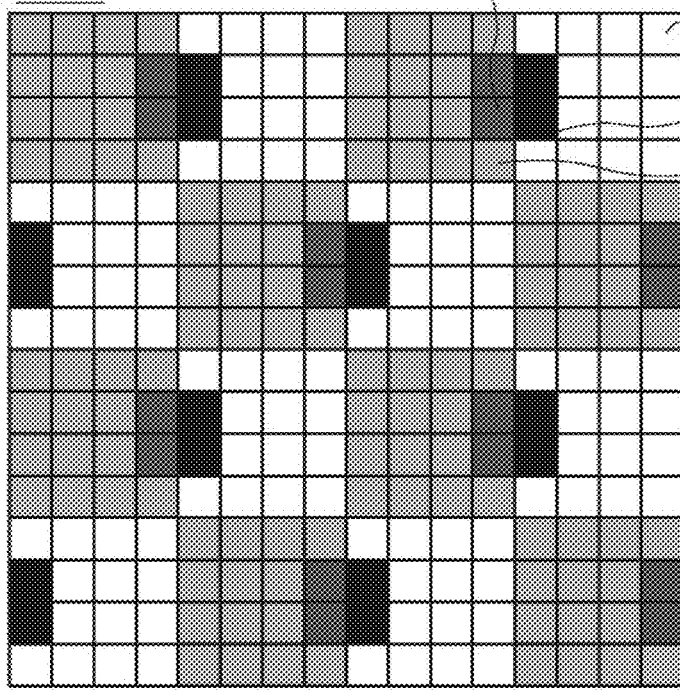
FIG. 12 is an enlarged view showing print patterns in an example 2-2 and an example 4-2.

The print pattern PT301 in an example 2-2 is a print pattern formed on the sheet P as shown in FIG. 4 when print data specifying the solid image of the special color (silver) in the whole region of the A4 sheet P is transmitted from the host device 20 to the image forming apparatus 1 and the image forming apparatus 1 executes the brilliant superimposition print process by using the special color silver-dedicated data conversion table 88. In the case of the example 2-2, there is obtained a silver-black superimposition print as a print made by laying the print pattern PT301 (whose enlarged view is shown in FIG. 12) throughout the whole region of the A4 sheet P as shown in FIG. 4.

In the print pattern PT301 in comparison with the print pattern PT1 (FIG. 5), each black developer image square IBS has moved in a horizontal direction (leftward direction) by two dots. Therefore, the left half of the black developer image square IBS overlaps with the silver developer image square ISS. The image forming apparatus 1 prints the black developer image IB as a solid image of the black developer under the silver developer image IS as a solid image of the silver developer. By executing the brilliant superimposition print process, regions where a part of a black developer image square IBS and a silver developer image square ISS overlap with each other are formed. As above, in the print pattern PT301, 50[%] of the area of the black developer image IB overlaps with the silver developer image IS. In the following description, such a state in which 50[%] of the area of the black developer image IB overlaps with the silver developer image IS as in the print pattern PT301 is referred to also as an overlap rate 50[%] as a superimposition ratio.

1-7-3. Example 2-3

As shown in FIG. 4 and FIG. 6, a print pattern PT401 in an example 2-3 is the same as the print pattern PT101 in the example 1-2. In the print pattern PT401, 100[%] of the area of the black developer image IB overlaps with the silver developer image IS. In the following description, such a state in which 100[%] of the area of the black developer image IB overlaps with the silver developer image IS as in the print pattern PT401 is referred to also as an overlap rate 100[%] as a superimposition ratio.

1-8. Comparative Example

Figure 13:
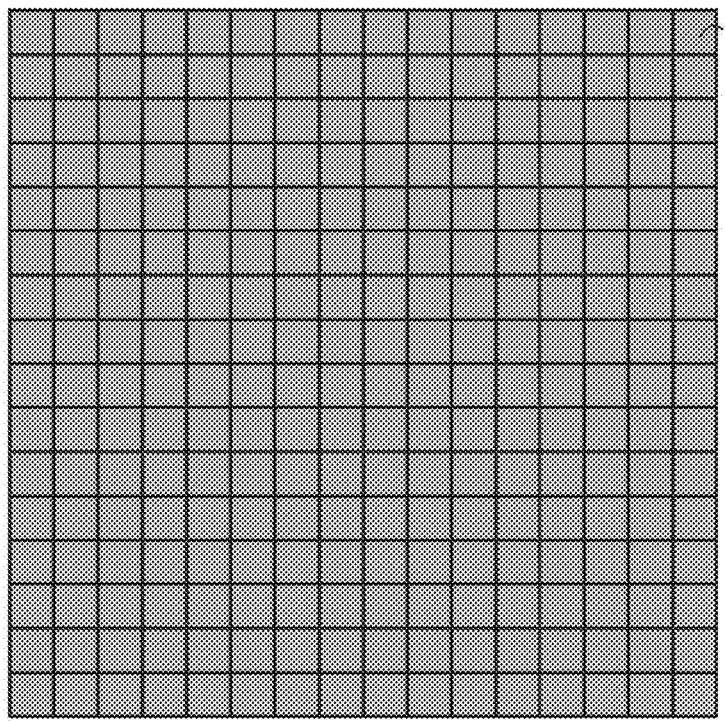
FIG. 13 is an enlarged view showing a print pattern in a comparative example.

A print pattern PT501 in a comparative example is a print pattern formed on the sheet P as shown in FIG. 13 by the image forming apparatus 1 by executing the silver developer print process without using the special color silver-dedicated data conversion table 88 when print data specifying the solid image of the special color (silver) in the whole region of the A4 sheet P is transmitted from the host device 20 to the image forming apparatus 1. In the case of the comparative example, there is obtained a silver print as a print made by laying the print pattern PT501 (whose enlarged view is shown in FIG. 13) throughout the whole region of the A4 sheet P as shown in FIG. 4.

The print pattern PT501 is made up exclusively of the silver developer image IS formed with the silver developer. Further, in the print pattern PT501, as viewed in the 16×16 dot range, for example, the silver developer image IS is formed for 256 dots as dots corresponding to the whole of the 16×16 dot range.

1-9. Measurement and Evaluation of Developers

Next, measurement and evaluation of the developers will be described below. For the measurement and evaluation of the developers, prescribed images were printed on the sheets P by the image forming apparatus 1 (FIG. 1) by using the developers, and the measurement and evaluation were performed in regard to the tint, the luster, the texturedness and the luster irregularity.

In this evaluation, the silver developer was stored in the developer container 12 (FIG. 2) of the image forming unit 10S corresponding to the special color and the black developer was stored in the developer container 12 (FIG. 2) of the image forming unit 10K corresponding to the black in the image forming apparatus 1 (C941dn: manufactured by Oki Electric Industry Co., Ltd.) (FIG. 1), the print processes of the example 2-1, the example 2-2, the example 2-3 and the comparative example were executed, and the evaluation was performed in regard to the tint, the luster, the texturedness and the luster irregularity by using the same three types of sheets P as in the example 1 and by the same measurement method and evaluation method as in the example 1.

1-10. Measurement Result and Evaluation Result

In the following, a description will be given of the result of the evaluation tests for checking the effects of the examples and of effects understandable from the result.

As shown in FIG. 14, in cases of the coat paper (10-point mean roughness Rz=2.4 [μm]), when the overlap rate was set less than or equal to 50[%], the tint (luminous reflectance difference ΔY) and the luster level (FI value) were excellent, no texturedness or luster irregularity of the printing was found, and the judgment results were excellent.

As shown in FIG. 15, in cases of the high-quality paper (10-point mean roughness Rz=15.3 [μm]), when the overlap rate was set higher than or equal to 50[%], the tint and the luster level were excellent, no texturedness or luster irregularity of the printing was found, and the judgment results were excellent.

As shown in FIG. 16, in cases of the plain paper (10-point mean roughness Rz=26.5 [μm]), when the overlap rate was set at 100[%], the tint and the luster level were excellent, no texturedness or luster irregularity of the printing was found, and the judgment results were excellent.

On the other hand, in any of the cases of the coat paper, the high-quality paper and the plain paper, the judgment result was not excellent regarding the print pattern PT501 (FIG. 13) of the comparative example as shown in FIG. 14, FIG. 15 and FIG. 16.

Based on the above results, in the image forming apparatus 1, the overlap rate depending on the surface roughness (10-point mean roughness Rz) of the medium was set as follows:

When 0 [μm] 10-point mean roughness Rz<15.3 [μm], the overlap rate is set at 0[%] (namely, the black developer image IB is not overlapped with the silver developer image IS).

When 15.3 [μm] 10-point mean roughness Rz<26.5 [μm], the overlap rate is set at 50[%].

When 26.5 [μm] 10-point mean roughness Rz, the overlap rate is set at 100[%].

As above, the image forming apparatus 1 was set so as to increase the overlap rate with the increase in the surface roughness of the medium (i.e., as the surface becomes rougher). With this setting, the image forming apparatus 1 is capable of obtaining an excellent print with excellent tint and luster and no texturedness or luster irregularity of the printing.

Figure 17A:
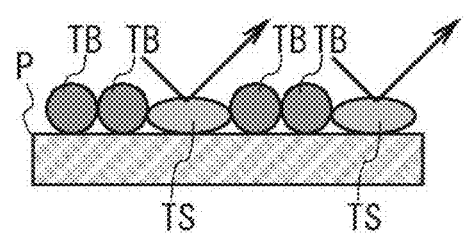
FIGS. 17(A), 17(B) and 17(C) are diagrams showing conditions of a silver developer and a black developer varying depending on an overlap rate.

In this regard, when the overlap rate is set at 0[%] and the black developer TB is not arranged under the silver developer TS in cases of a sheet P with high smoothness (low surface roughness) as shown in FIG. 17(A), the silver developer TS is unlikely to enter a concave part (not shown in FIG. 17 (A)) of the sheet P since the concave part is shallow, and light applied to the silver developer TS undergoes regular reflection as indicated by the solid line in FIG. 17 (A). Accordingly, when the smoothness of the sheet P is high, the orientation of the brilliant pigment does not deteriorate, and the luster, the texturedness and the luster irregularity become excellent.

Figure 17B:
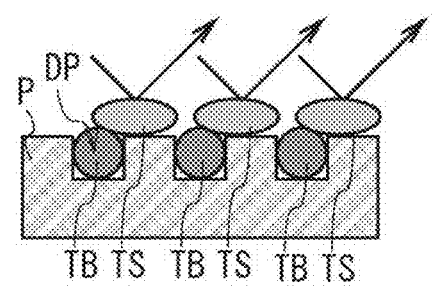

When the overlap rate is set at 50[%] and the black developer TB is arranged under the silver developer TS in cases of a sheet P with relatively low smoothness (relatively high surface roughness) as shown in FIG. 17(B), the black developer TB enters relatively wide concave parts DP and fills in the undulations of the sheet P, and thus the silver developer TS becomes unlikely to enter the concave parts DP and light applied to the silver developer TS undergoes regular reflection. Accordingly, when the overlap rate is set at 50[%] in cases of a sheet P with relatively low smoothness (relatively high surface roughness), the orientation of the brilliant pigment in the silver developer TS arranged over the black developer TB does not deteriorate.

Figure 17C:
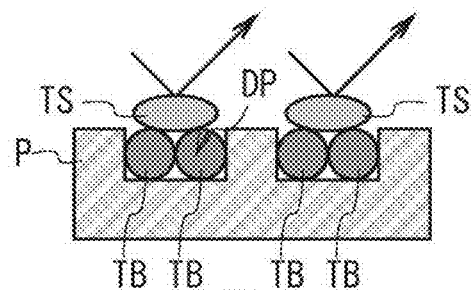

When the overlap rate is set at 100[%] and the black developer TB is arranged under the silver developer TS in cases of a sheet P with low smoothness (high surface roughness) as shown in FIG. 17(C), the black developer TB enters wide concave parts DP and fills in the undulations of the sheet P, and thus the silver developer TS becomes unlikely to enter the concave parts DP and light applied to the silver developer TS undergoes regular reflection. Accordingly, when the overlap rate is set at 100[%] in cases of a sheet P with low smoothness (high surface roughness), the orientation of the brilliant pigment in the silver developer TS arranged over the black developer TB does not deteriorate.

1-11. Print Process

Figure 18:
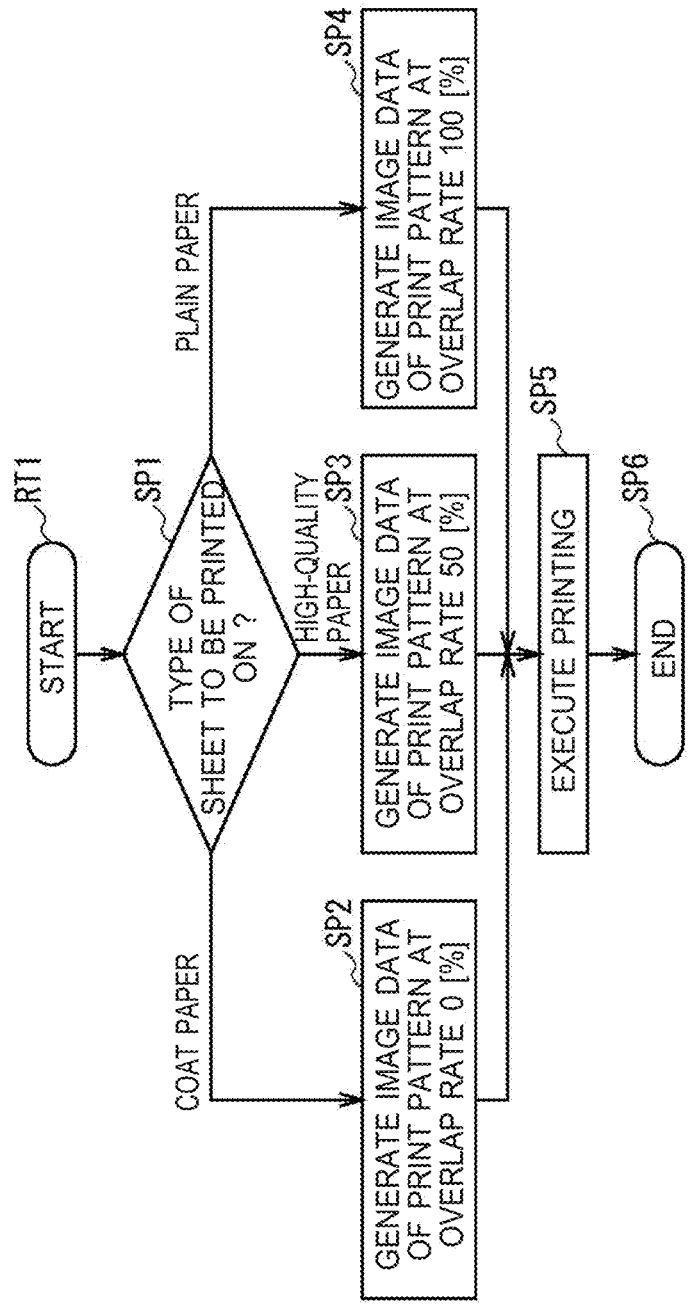
FIG. 18 is a flowchart showing a print procedure according to a first embodiment.

Next, a print procedure executed by the image forming apparatus 1 depending on the type of the sheet P will be described below by using a flowchart shown in FIG. 18. The print controller 3 reads out a print process program from the memory 19, executes the print process program, and thereby starts a print procedure RT1 shown in FIG. 18 and advances to step SP1.

In the step SP1, when print data transmitted from the host device 20 is print data of the color represented as silver 100[%], the print controller 3 judges the type (coat paper, high-quality paper or plain paper) of the sheet selected by the user through a sheet selection section on a touch panel provided on the image forming apparatus 1 or a sheet selection section of a printer driver in the host device 20. When the sheet type is judged to be the coat paper, the print controller 3 advances to step SP2. In the step SP2, the print controller 3 generates image data of the print pattern PT201 (FIG. 5) at the overlap rate 0[%] according to conversion formulas included in the special color silver-dedicated data conversion table 88, and advances to step SP5.

When the sheet type is judged to be the high-quality paper in the step SP1, the print controller 3 advances to step SP3. In the step SP3, the print controller 3 generates image data of the print pattern PT301 (FIG. 12) at the overlap rate 50[%] according to conversion formulas included in the special color silver-dedicated data conversion table 88, and advances to the step SP5.

When the sheet type is judged to be the plain paper in the step SP1, the print controller 3 advances to step SP4. In the step SP4, the print controller 3 generates image data of the print pattern PT401 (FIG. 6) at the overlap rate 100[%] according to conversion formulas included in the special color silver-dedicated data conversion table 88, and advances to the step SP5.

In the step SP5, the print controller 3 executes the printing by forming an image according to the generated image data on the sheet P, advances to step SP6, and ends the print procedure RT1.

1-12. Summary

Based on the above-described results, when print data of the color represented as silver 100[%] is received, the image forming apparatus 1 is capable of obtaining a print that is excellent in regard to the tint, the luster, the texturedness and the luster irregularity by executing the printing with the print pattern PT1 (FIG. 5), the print pattern PT301 (FIG. 12) or the print pattern PT101 (FIG. 6) using black (K) and silver (S) depending on the surface roughness of the sheet P to be printed on according to conversion formulas included in the special color silver-dedicated data conversion table 88.

1-13. Functional Configuration of Image Forming Apparatus

Here, the basic functions of the image forming apparatus 1 related to the print process are expressed in the form of a functional block diagram as shown in FIG. 19.

A first image forming section 90 corresponds to the image forming unit 10S (FIG. 1), and is capable of forming the silver developer image IS as the brilliant developer image. A second image forming section 91 corresponds to the image forming unit 10K (FIG. 1), and is capable of forming the black developer image IB as a black developer image. A transfer section 92 corresponds to the secondary transfer section 49 (FIG. 1), and is capable of transferring the silver developer image IS and the black developer image IB onto the sheet P as the medium.

A controller 93 corresponds to the print controller 3 (FIG. 3), controls the operation of the first image forming section 90 and the second image forming section 91 according to received print data. When forming a brilliant image based on the print data, the controller 93 performs control to form a brilliant image in which relative position between the silver developer image IS and the black developer image IB is changed depending on the surface roughness as a medium type. Incidentally, in this embodiment, the controller 93 controls the first image forming section 90 so that the silver developer image IS is formed at the same position on the medium, and then controls the second image forming section 91 so as to change the relative position of the black developer image IB on the medium. The control by the controller 93 is not limited to this example. It is also possible for the controller 93 to execute control so that the black developer image IB is formed at the same position on the medium and then change the relative position of the silver developer image IS on the medium, or to change the relative positions of both of the black developer image IB and the silver developer image IS on the medium.

1-14. Effect and Other Features

Here, when the silver developer on-medium formation amount on the sheet P is small, the FI value becomes large whereas the luminous reflectance difference $\Delta Y$ becomes small. In contrast, when the silver developer on-medium formation amount on the sheet P is large, the luminous reflectance difference $\Delta Y$ becomes large whereas the FI value becomes small. As above, while increasing the silver developer on-medium formation amount on the sheet P works for increasing the luminous reflectance difference $\Delta Y$, the FI value adversely decreases with the increase in the silver developer on-medium formation amount. Namely, the FI value and the luminous reflectance difference $\Delta Y$ are in a trade-off relationship and it has been difficult to achieve both of high brilliance (a large FI value) and a large luminous reflectance difference $\Delta Y$.

In contrast, when the image forming apparatus 1 receives print data of a single color of the silver developer, the image forming apparatus 1 does not form only a silver developer image IS made of the silver developer on the medium but forms a silver developer image IS made of the silver developer and a black developer image IB made of the black developer like the print pattern PT1 (FIG. 5), the print pattern PT301 (FIG. 12) or the print pattern PT101 (FIG. 6).

Therefore, the image forming apparatus 1 is capable of supplementing the luminous reflectance difference $\Delta Y$ with the black developer image IB while inhibiting the decrease in the FI value by reducing the silver developer on-medium formation amount. Accordingly, even in a state in which the silver developer on-medium formation amount is small, the image forming apparatus 1 is capable of obtaining a print in the silver color achieving both of high brilliance (large FI value) and a high color tone (large luminous reflectance difference $\Delta Y$). As above, the image forming apparatus 1 is capable of achieving both of the metallic luster (FI value) and the color tone (luminous reflectance difference $\Delta Y$) of the image.

Further, the image forming apparatus 1 is configured to increase the overlap rate, which is the ratio of the black developer image IB overlapping with the silver developer image IS to the whole of the black developer image IB on the sheet P, with the increase in the surface roughness of the sheet P (i.e., as the surface becomes rougher) by changing the relative position between the silver developer image IS and the black developer image IB on the sheet P included in the brilliant image depending on the type of the sheet P, namely, depending on the surface roughness of the sheet P.

Therefore, even in cases of a sheet P with low smoothness, the image forming apparatus 1 is capable of filling in the concave parts DP of the sheet P with the black developer TB, making the silver developer TS unlikely to enter the concave parts DP, and maintaining the orientation of the brilliant pigment in the silver developer TS arranged over the black developer TB. Accordingly, the image forming apparatus 1 is capable of enhancing the metallic luster (FI value) and the color tone (luminous reflectance difference $\Delta Y$) of the image while inhibiting the texturedness and the luster irregularity. As above, the image forming apparatus 1 is capable of achieving both of the metallic luster (FI value) and the color tone (luminous reflectance difference $\Delta Y$) of the image irrespective of the surface roughness (smoothness) of the sheet P.

Furthermore, the image forming apparatus 1 is configured to form the silver developer image region ARIS to be larger (wider) than the black developer image region ARIB. Therefore, the image forming apparatus 1 is capable of improving the luster (FI value) compared to cases where the silver developer image region ARIS and the black developer image region ARIB occupy regions of the same size, for example.

According to the above-described configuration, the image forming apparatus 1 includes the first image forming section 90 capable of forming the silver developer image IS, the second image forming section 91 including at least one image forming unit 10 capable of forming the black developer image IB, the transfer section 92 capable of transferring the silver developer image IS and the black developer image IB onto the sheet P, and the print controller 3 that controls the operation of the first image forming section 90 and the second image forming section 91 according to received print data. When forming a brilliant image based on the print data, the print controller 3 performs printing to form a brilliant image in which the relative position between the silver developer image IS and the black developer image IB is changed depending on the medium type.

Accordingly, the image forming apparatus 1 is capable of supplementing the luminous reflectance difference $\Delta Y$ with the black developer image IB while inhibiting the decrease in the FI value by reducing the developer amount of the silver developer formed on the sheet P.

2. Second Embodiment

2-1. Print Patterns in Example 3

Next, print patterns in an example 3 will be described below.

2-1-1. Example 3-1

As shown in FIG. 4 and FIG. 5, a print pattern PT601 in an example 3-1 is the same as the print pattern PT1 in the example 1-1.

2-1-2. Example 3-2

As shown in FIG. 4 and FIG. 6, a print pattern PT701 in an example 3-2 is the same as the print pattern PT101 in the example 1-2.

2-2. Measurement and Evaluation of Developers

Next, measurement and evaluation of the developers will be described below. For the measurement and evaluation of the developers, prescribed images were printed on the sheets P by an image forming apparatus 101 (FIG. 1) by using the developers, and the measurement and evaluation were performed in regard to the tint and the luster.

In this evaluation, the silver developer was stored in the developer container 12 (FIG. 2) of the image forming unit 10S corresponding to the special color and the black developer was stored in the developer container 12 (FIG. 2) of the image forming unit 10K corresponding to the black in the image forming apparatus 101 (C941dn: manufactured by Oki Electric Industry Co., Ltd.) (FIG. 1), the print processes of the example 3-1 and the example 3-2 were executed, and the evaluation was performed in regard to the tint and the luster by the same measurement method and evaluation method as in the example 1 and the example 2.

Specifically, in this evaluation, thin paper (Color Copy 100: 100 [g/m$^2$], manufactured by Mondi Corp.), regular paper (Color Copy 200: 200 [g/m$^2$], manufactured by Mondi Corp.) and thick paper (Color Copy 300: 300 [g/m$^2$], manufactured by Mondi Corp.) were used as three types of sheets P.

2-2-1. Measurement of Smoothness

Here, measurement of the smoothness of the sheet P will be described below. In this measurement, the smoothness of the sheet surface was measured by measuring the 10-point mean roughness Rz [μm] of the three types of sheets P in a 300 [μm] by 300 [μm] square region by using the super-depth shape measurement microscope (VK-8500: manufactured by Keyence Corporation) at a magnification of 20 times.

2-2-2. Measurement and Evaluation of Tint

In this evaluation, the luminous reflectance difference $\Delta Y$ was measured by the same measurement method as in the example 1 and the evaluation was performed by the same evaluation method as in the example 1.

2-2-3. Measurement and Evaluation of Luster

In this evaluation, the brilliance was measured by the same measurement method as in the example 1 and the evaluation was performed by the same evaluation method as in the example 1.

2-3. Measurement Result and Evaluation Result

In the following, a description will be given of the result of the evaluation tests for checking the effects of the examples and of effects understandable from the result.

As shown in FIG. 20, in the case of the example 3-1, on thin media (sheet thickness: 100 [g/m$^2$]) like the thin paper (Color Copy 100), the tint (luminous reflectance difference $\Delta Y$) and the luster level (FI value) were excellent and the judgment results were excellent without the need of overlapping the black developer image IB and the silver developer image IS with each other. However, in the case of the example 3-1, the tint was not excellent on thick media (sheet thickness: 300 [g/m$^2$]) like the thick paper (Color Copy 300).

As shown in FIG. 21, when the black developer image IB and the silver developer image IS were overlapped as in the example 3-2, on relatively thick media (sheet thickness: 200 [g/m$^2$]) like the regular paper (Color Copy 200) and thick media (sheet thickness: 300 [g/m$^2$]) like the thick paper (Color Copy 300), the tint and the luster level were excellent and the judgment results were excellent. However, in the case of the example 3-2, the tint was not excellent on thin media (sheet thickness: 100 [g/m$^2$]) like the thin paper (Color Copy 100).

Based on the above results, in the image forming apparatus 101, since the sheets P used in this evaluation were substantially equivalent to each other in the surface roughness whereas the sheet thickness influenced the tint, a threshold value of the sheet thickness for judging between media with large sheet thickness and media with small sheet thickness (i.e., between media with high basis weight and media with low basis weight) was set at 200 [g/m$^2$]. Further, the image forming apparatus 101 was set so as to form the black developer image IB and the silver developer image IS on the medium without overlapping them with each other in cases of a thin medium with the sheet thickness less than the threshold value 200 [g/m$^2$] like Color Copy 100, and to form the black developer image IB and the silver developer image IS on the medium while superimposing the silver developer image IS on the black developer image IB in cases of a thick medium with the sheet thickness greater than or equal to the threshold value 200 [g/m$^2$] like Color Copy 200 and Color Copy 300. With these settings, the image forming apparatus 101 is capable of obtaining an excellent print with excellent tint and luster and no texturedness or luster irregularity of the printing.

Of two or more kinds of sheets P having different thickness, a thinner sheet P is also referred to as a first medium, and a thicker sheet P is also referred to as a second medium.

2-4. Print Patterns in Example 4

Next, print patterns in an example 4 will be described below.

2-4-1. Example 4-1

As shown in FIG. 4 and FIG. 5, a print pattern PT801 in an example 4-1 is the same as the print pattern PT601 in the example 3-1.

2-4-2. Example 4-2

As shown in FIG. 4 and FIG. 12, a print pattern PT901 in an example 4-2 is the same as the print pattern PT301 in the example 2-2.

2-4-3. Example 4-3

As shown in FIG. 4 and FIG. 6, a print pattern PT1001 in an example 4-3 is the same as the print pattern PT701 in the example 3-2.

2-5. Measurement and Evaluation of Developers

Next, measurement and evaluation of the developers will be described below. For the measurement and evaluation of the developers, prescribed images were printed on the sheets P by the image forming apparatus 101 (FIG. 1) by using the developers, and the measurement and evaluation were performed in regard to the tint and the luster.

In this evaluation, the silver developer was stored in the developer container 12 (FIG. 2) of the image forming unit 10S corresponding to the special color and the black developer was stored in the developer container 12 (FIG. 2) of the image forming unit 10K corresponding to the black in the image forming apparatus 101 (C941dn: manufactured by Oki Electric Industry Co., Ltd.) (FIG. 1), the print processes of the example 4-1, the example 4-2, the example 4-3 and the comparative example (FIG. 13) were executed, and the evaluation was performed in regard to the tint and the luster by using the same three types of sheets P as in the example 3 and by the same measurement method and evaluation method as in the example 3.

2-6. Measurement Result and Evaluation Result

In the following, a description will be given of the result of the evaluation tests for checking the effects of the examples and of effects understandable from the result.

As shown in FIG. 23, in cases of the thin paper (sheet thickness: 100 [g/m$^2$]), when the overlap rate was set less than or equal to 50[%], the tint (luminous reflectance difference $\Delta Y$) and the luster level (FI value) were excellent and the judgment results were excellent.

As shown in FIG. 24, in cases of the regular paper (sheet thickness: 200 [g/m$^2$]), when the overlap rate was set greater than or equal to 50[%], the tint and the luster level were excellent and the judgment results were excellent.

As shown in FIG. 25, in cases of the thick paper (sheet thickness: 300 [g/m$^2$]), when the overlap rate was set at 100[%], the tint and the luster level were excellent and the judgment results were excellent.

On the other hand, in any of the cases of the thin paper, the regular paper and the thick paper, the judgment result was not excellent regarding the print pattern PT501 (FIG. 13) of the comparative example as shown in FIG. 23, FIG. 24 and FIG. 25.

Based on the above results, in the image forming apparatus 101, the overlap rate depending on the sheet thickness of the medium was set as follows:

When 100 [g/m$^2$]≤sheet thickness<200 [g/m$^2$], the overlap rate is set at 0[%] (namely, the black developer image IB is not overlapped with the silver developer image IS).

When 200 [g/m$^2$]≤sheet thickness<300 [g/m$^2$], the overlap rate is set at 50[%].

When 300 [g/m$^2$]≤sheet thickness the overlap rate is set at 100[%].

As above, the image forming apparatus 101 was set so as to increase the overlap rate with the increase in the sheet thickness of the medium. With this setting, the image forming apparatus 101 is capable of obtaining an excellent print with excellent tint and luster and no texturedness or luster irregularity of the printing.

In this regard, as shown in FIG. 22(A), in cases of the thin paper Pn, the developer T sufficiently melts down when the thin paper Pn passes through the fixation section 65 (FIG. 1) since the amount of heat absorption into the thin paper Pn is small. In contrast, as shown in FIG. 22(B), in cases of the thick paper Pc, the developer T does not sufficiently melt down when the thick paper Pc passes through the fixation section 65 since the amount of heat absorption into the thick paper Pc is larger than that into the thin paper Pn. It can be considered that the luminous reflectance difference $\Delta Y$ became large in cases of the thick paper Pc since such a developer T not melted down was thick without being stretched smoothly, was nontransparent, and looked blackish.

In this regard, as shown in FIG. 22(C), in cases where the fixation temperature of the fixation section 65 was raised, a tendency of the density (luminous reflectance difference ΔY) to decrease was obtained. However, in these cases, the fixation temperature needed to be raised to a device setting upper limit that is +10 [° C.] from a standard value. Further, with the rise in the fixation temperature, deterioration in fixation irregularity in a patchy condition in the print result was observed. Thus, by the adjustment by means of the fixation temperature, it was difficult to lower the luminous reflectance difference ΔY while inhibiting the fixation irregularity.

In contrast, in cases where the overlap rate is increased, it can be considered that the area of the silver developer TS concealing the black developer TB on the sheet P increases and the luminous reflectance difference ΔY decreases.

2-7. Print Process

Next, a print procedure executed by the image forming apparatus 101 depending on the thickness of the sheet P will be described below by using a flowchart shown in FIG. 26. The print controller 3 reads out a print process program from the memory 19, executes the print process program, and thereby starts a print procedure RT101 shown in FIG. 26 and advances to step SP11.

In the step SP11, when print data transmitted from the host device 20 is print data of the color represented as silver 100[%], the print controller 3 judges the type (thin paper, regular paper or thick paper) of the sheet to be printed on selected by the user through the sheet selection section on the touch panel provided on the image forming apparatus 101 or the sheet selection section of the printer driver in the host device 20. When the sheet type is judged to be the thin paper, the print controller 3 advances to step SP12. In the step SP12, the print controller 3 generates image data of the print pattern PT801 (FIG. 5) at the overlap rate 0[%] according to conversion formulas included in the special color silver-dedicated data conversion table 88, and advances to step SP15.

When the sheet type is judged to be the regular paper in the step SP11, the print controller 3 advances to step SP13. In the step SP13, the print controller 3 generates image data of the print pattern PT901 (FIG. 12) at the overlap rate 50[%] according to conversion formulas included in the special color silver-dedicated data conversion table 88, and advances to the step SP15.

When the sheet type is judged to be the thick paper in the step SP11, the print controller 3 advances to step SP14. In the step SP14, the print controller 3 generates image data of the print pattern PT1001 (FIG. 6) at the overlap rate 100[%] according to conversion formulas included in the special color silver-dedicated data conversion table 88, and advances to the step SP15.

In the step SP15, the print controller 3 executes the printing by forming an image according to the generated image data on the sheet P, advances to step SP16, and ends the print procedure RT101.

2-8. Summary

Based on the above-described results, when print data of the color represented as silver 100[%] is received, the image forming apparatus 101 is capable of obtaining a print that is excellent in regard to the tint and the luster by executing the printing with the print pattern PT801 (FIG. 5), the print pattern PT901 (FIG. 12) or the print pattern PT1001 (FIG. 6) using black (K) and silver (S) depending on the sheet thickness of the sheet P to be printed on according to conversion formulas included in the special color silver-dedicated data conversion table 88.

2-9. Functional Configuration of Image Forming Apparatus

Here, the basic functions of the image forming apparatus 101 related to the print process are expressed in the form of a functional block diagram as shown in FIG. 19.

The first image forming section 90 corresponds to the image forming unit 10S (FIG. 1), and is capable of forming the silver developer image IS as the brilliant developer image. The second image forming section 91 corresponds to the image forming unit 10K (FIG. 1), and is capable of forming the black developer image IB as the black developer image. The transfer section 92 corresponds to the secondary transfer section 49 (FIG. 1), and is capable of transferring the silver developer image IS and the black developer image IB onto the sheet P as the medium.

A controller 193 corresponds to the print controller 3 (FIG. 3), controls the operation of the first image forming section 90 and the second image forming section 91 according to received print data. When forming a brilliant image based on the print data, the controller 193 performs control to form a brilliant image in which the relative position between the silver developer image IS and the black developer image IB is changed depending on the sheet thickness as a medium type.

2-10. Effect and Other Features

With the above-described configuration, the image forming apparatus 101 is configured to increase the overlap rate, which is the ratio of the black developer image IB overlapping with the silver developer image IS to the whole of the black developer image IB on the sheet P, with the increase in the sheet thickness of the sheet P (i.e., as the sheet P becomes thicker) by changing the relative position between the silver developer image IS and the black developer image IB on the sheet P included in the brilliant image depending on the type of the sheet P, namely, depending on the sheet thickness of the sheet P.

In cases of the thick paper Pc, if the fixation is executed at the same fixation temperature, the developer T does not sufficiently melt down when the thick paper Pc passes through the fixation section 65 and the luminous reflectance difference ΔY increases and deteriorates. The image forming apparatus 101 is capable of lowering the luminous reflectance difference ΔY by increasing the area of the silver developer TS concealing the black developer TB on the thick paper Pc. Accordingly, the image forming apparatus 101 is capable of achieving both of the metallic luster (FI value) and the color tone (luminous reflectance difference ΔY) of the image irrespective of the sheet thickness of the sheet P.

In addition, the image forming apparatus 101 according to the second embodiment is capable of achieving effects similar to those of the image forming apparatus 1 according to the first embodiment.

3. Other Embodiments

Incidentally, in the above-described first embodiment, descriptions were given of cases where the image forming apparatus 1 refers to the special color silver-dedicated data conversion table 88 depending on the type (coat paper, high-quality paper, plain paper or the like) of the sheet P selected by the user through the sheet selection section on the touch panel provided on the image forming apparatus 1 or the sheet selection section of the printer driver in the host device 20 and changes the relative position between the silver developer image IS and the black developer image IB on the sheet P depending on the surface roughness of the selected sheet P. The present disclosure is not limited to such cases and the image forming apparatus 1 may also be configured to arrange sheets P and sheets P2 differing from each other in the surface roughness respectively in/on the sheet cassette 51 and the sheet tray 61 and change the relative position between the silver developer image IS and the black developer image IB on the sheet P depending on from which of the sheet cassette 51 and the sheet tray 61 the sheet P or the sheet P2 is sent out.

In the above-described second embodiment, descriptions were given of cases where the image forming apparatus 101 refers to the special color silver-dedicated data conversion table 88 depending on the type (thin paper, regular paper, thick paper or the like) of the sheet P selected by the user through the sheet selection section on the touch panel provided on the image forming apparatus 101 or the sheet selection section of the printer driver in the host device 20 and changes the relative position between the silver developer image IS and the black developer image IB on the sheet P depending on the sheet thickness of the selected sheet P. The present disclosure is not limited to such cases and the image forming apparatus 101 may also be configured to arrange sheets P and sheets P2 differing from each other in the sheet thickness respectively in/on the sheet cassette 51 and the sheet tray 61 and change the relative position between the silver developer image IS and the black developer image IB on the sheet P depending on from which of the sheet cassette 51 and the sheet tray 61 the sheet P or the sheet P2 is sent out.

The image forming apparatus 1 may also be configured to detect the surface roughness of the sheet P with a sensor provided on each of the sheet cassette 51 and the sheet tray 61 and change the relative position between the silver developer image IS and the black developer image IB on the sheet P depending on the result of the detection even when the type of the sheet P is not selected by the user.

The image forming apparatus 101 may also be configured to detect the sheet thickness of the sheet P with a sensor provided on each of the sheet cassette 51 and the sheet tray 61 and change the relative position between the silver developer image IS and the black developer image IB on the sheet P depending on the result of the detection even when the type of the sheet P is not selected by the user.

The image forming apparatus 1 may also be configured to increase the overlap rate of the silver developer image IS and the black developer image IB on the sheet P when a sheet P whose surface is not coated is selected (since its surface is rougher compared to a sheet P whose surface is coated), and decrease the overlap rate of the silver developer image IS and the black developer image IB on the sheet P when a sheet P whose surface is coated is selected (since its surface is smoother compared to a sheet P whose surface is not coated).

The image forming apparatus 1 may also be configured to allow the user to select a cellulose medium or a film medium, increase the overlap rate of the silver developer image IS and the black developer image IB on the medium when the cellulose medium is selected (since its surface is rougher compared to the film medium), and decrease the overlap rate of the silver developer image IS and the black developer image IB on the medium when the film medium is selected (since its surface is smoother compared to the cellulose medium).

The image forming apparatus 1 may also be configured so that the relative position between the silver developer image IS and the black developer image IB on the sheet P already determined by the user's selection of the type of the sheet P can be changed by the user through the input section on the touch panel provided on the image forming apparatus 1 or the input section of the printer driver in the host device 20. In this case, when forming a brilliant image based on print data, the print controller 3 performs control to form a brilliant image while changing the relative position between the silver developer image IS and the black developer image IB depending on an input result of the input section. The same goes for the second embodiment.

The image forming apparatus 1 may also be configured to allow the user to change the print image density and the adhesion amount in regard to the silver developer TS and the black developer TB in addition to the changing of the relative position between the silver developer image IS and the black developer image IB on the sheet P. The same goes for the second embodiment.

When printing print data of a single color of the silver developer, the image forming apparatus 1 may also arrange the black developer image IB as a layer under the silver developer image IS (i.e., between the silver developer image IS and the sheet P) so as to overlap with at least a part of the silver developer image IS on the sheet P irrespective of the type of the sheet P. The same goes for the second embodiment. In that case, the image forming apparatus 1 is capable of enhancing the luster irregularity compared to cases where the brilliant image is formed only with the silver developer image IS.

In the above-described first embodiment, descriptions were given of cases where the image forming apparatus 1 executes the printing with the print pattern PT1 (FIG. 5) when the overlap rate is 0[%], executes the printing with the print pattern PT301 (FIG. 12) when the overlap rate is 50[%], and executes the printing with the print pattern PT101 (FIG. 6) when the overlap rate is 100[%]. The present disclosure is not limited to such cases and the image forming apparatus 1 may also execute the printing with a print pattern made up of a silver developer image IS and a black developer image IB in various other shapes with various other numbers of dots as long as the printing satisfies the overlap rate. The same goes for the second embodiment.

In the above-described first embodiment, descriptions were given of cases where the image forming apparatus 1 forms the white color regions WH in the print pattern PT1 (FIG. 5), the print pattern PT301 (FIG. 12) or the print pattern PT101 (FIG. 6) as regions where no developer image is formed. The present disclosure is not limited to such cases and the image forming apparatus 1 may also form the white color regions WH as regions where a developer image in the white color (white) is formed. The same goes for the second embodiment.

In the above-described first embodiment, descriptions were given of cases where the image forming apparatus 1 forms the black developer image IB with the black developer alone. The present disclosure is not limited to such cases and the image forming apparatus 1 may also form a black developer image (black developer image) made with process black by combining the yellow developer, the magenta developer and the cyan developer being non-brilliant developers as developers of a plurality of colors. In that case, the second image forming section 91 (FIG. 19) corresponds to the image forming units 10C, 10M and 10Y (FIG. 1). Further, the image forming apparatus 1 may also form a black developer image made with process black by combining the yellow developer, the magenta developer, the cyan developer and the black developer being non-brilliant developers. In that case, the second image forming section 91 (FIG. 19) corresponds to the image forming units 10C, 10M, 10Y and 10K (FIG. 1). The same goes for the second embodiment.

In the above-described first embodiment, descriptions were given of cases where the image forming apparatus 1 employs minute flakes each having a planar part as aluminum (Al) contained in the brilliant pigment used when producing the developer. The present disclosure is not limited to such cases and the image forming apparatus 1 may also employ small pieces in various shapes such as spherical shapes, rodlike shapes or the like, for example, as aluminum (Al) contained in the brilliant pigment. The same goes for the second embodiment.

In the above-described first embodiment, descriptions were given of cases where the image forming apparatus 1 employs aluminum (Al) as the metal contained in the brilliant pigment used when producing the developer. The present disclosure is not limited to such cases and the image forming apparatus 1 may also employ a variety of metal such as brass, iron oxide or the like, for example. In this case, the color exhibited by the developer fixed on the sheet P is a color depending on the metal. The same goes for the second embodiment. Further, although the brilliant pigment containing aluminum is used in the above-described embodiments, it is also possible to use a pearl pigment containing mica and titanium oxide as the brilliant pigment.

In the above-described first embodiment, the image forming apparatus 1 was described in regard to cases where metallic color expressiveness is evaluated by using the silver developer as an example of the brilliant developer. The present disclosure is not limited to such cases and the image forming apparatus 1 may also use the gold developer (gold color developer) as an example of the brilliant developer. In that case, the gold developer may be manufactured by the following manufacturing method. While the silver developer was manufactured by adding aluminum as the brilliant pigment at the time of the manufacture in the above-described embodiments, the gold developer is manufactured by also adding a yellow pigment (in this example, C. I. Pigment Yellow 180 as an organic pigment), a magenta pigment (in this example, C. I. Pigment Red 122 as an organic pigment), red-orange color fluorescent coloring matter (FM-34N_Orange: manufactured by Sinloihi Co., Ltd.) and yellow color fluorescent coloring matter (FM-35N Yellow: manufactured by Sinloihi Co., Ltd.) at the time of the manufacture. The same goes for the second embodiment.

In the above-described first embodiment, the image forming apparatus 1 was described in regard to cases where the on-medium formation amount of the developer is measured on the medium (sheet P) onto which the image pattern BT (FIG. 7) has been transferred. The present disclosure is not limited to such cases and the image forming apparatus 1 may also measure the on-medium formation amount of the developer on the photosensitive drum 36 before the transfer onto the sheet P, on the intermediate transfer belt 44, or the like. The same goes for the second embodiment.

In the above-described embodiments, descriptions were given of cases where the present disclosure is applied to developers used for the single component development method. The present disclosure is not limited to such cases. The present disclosure may also be applied to developers for the two-component development method as a method of providing the toner with an appropriate amount of electrification by mixing the toner with a carrier and using friction between the carrier and the toner.

In the above-described embodiments, descriptions were given of cases where the present disclosure is applied to the image forming apparatus 1 or 101 of the so-called intermediate transfer type (or secondary transfer type) in which the developer images of the respective colors are successively transferred from the photosensitive drums 36 of the image forming units 10 onto the intermediate transfer belt 44 in the overlaying manner and then the developer images are transferred from the intermediate transfer belt 44 onto the sheet P. The present disclosure is not limited to such cases. The present disclosure may also be applied to an image forming apparatus of the so-called direct transfer type in which the developer images of the respective colors are successively transferred from the photosensitive drums 36 of the image forming units 10 onto the sheet P as the medium in the overlaying manner. In the cases of the image forming apparatuses 1 and 101 in the embodiments, the image forming apparatus includes the primary transfer rollers 45 as the transfer sections that transfer the developer images on the photosensitive drums 36 onto the intermediate transfer belt 44 as the medium and the secondary transfer roller 46 as the transfer section that transfers the developer images on the intermediate transfer belt 44 onto the sheet P as the medium. In contrast, in cases of an image forming apparatus of the direct transfer type, the image forming apparatus includes only the transfer rollers as the transfer sections that transfer the developer images on the photosensitive drums onto the sheet as the medium.

In the above-described embodiments, descriptions were given of cases where the image forming apparatus 1 or 101 (FIG. 1) is provided with five image forming units 10. The present disclosure is not limited to such cases. The image forming apparatus 1 or 10 may also be provided with four or less or six or more image forming units 10.

In the above-described embodiments, descriptions were given of cases where the present disclosure is applied to the image forming apparatus 1 or 101 that is a single function printer. The present disclosure is not limited to such cases. The present disclosure may be applied also to an image forming apparatus having various other functions such as an MFP (Multi-Function Peripheral) having the functions of a copy machine and a facsimile machine, for example.

In the above-described embodiments, descriptions were given of cases where the present disclosure is applied to the image forming apparatus 1 or 101. The present disclosure is not limited to such cases. The present disclosure may be applied also to various types of electronic devices that form an image on a medium such as a sheet P by the electrophotographic method by using a developer, such as copy machines, for example.

The present disclosure is not limited to the embodiments and other embodiments described above. Namely, the scope of application of the present disclosure ranges also to embodiments obtained by arbitrarily combining part or all of the above-described embodiments and part or all of the above-described other embodiments. Further, the scope of application of the present disclosure ranges also to embodiments obtained by extracting a part of a configuration described in an arbitrary embodiment among the above-described embodiments and other embodiments and substituting/diverting the extracted part of the configuration for/to a part of the configuration of an arbitrary embodiment among the above-described embodiments and other embodiments or adding the extracted part of the configuration to an arbitrary embodiment.

In the above-described first embodiment, a description was given of a case where the image forming apparatus 1 as an image forming apparatus is formed with the first image forming section 90 as a first image forming section, the second image forming section 91 as a second image forming section, the transfer section 92 as a transfer section and the controller 93 as a controller. The present disclosure is not limited to such a case. It is also possible to form the image forming apparatus with a first image forming section, a second image forming section, a transfer section and a controller having various other configurations.

In the above-described second embodiment, a description was given of a case where the image forming apparatus 101 as an image forming apparatus is formed with the first image forming section 90 as a first image forming section, the second image forming section 91 as a second image forming section, the transfer section 92 as a transfer section and the controller 193 as a controller. The present disclosure is not limited to such a case. It is also possible to form the image forming apparatus with a first image forming section, a second image forming section, a transfer section and a controller having various other configurations.

The present disclosure is applicable to cases where an image is formed on a medium by the electrophotographic method by using a developer containing a metallic pigment.

DESCRIPTION OF REFERENCE CHARACTERS

1: image forming apparatus, 2: housing, 2T: sheet ejection tray, 3: print controller, 10: image forming unit, 11: image formation main unit, 12: developer container, 13: developer supply section, 14: LED head, 17: interface section, 18: display controller, 19: memory, 20: host device, 21: display section, 22: sensor, 23: CPU, 30: image formation housing, 31: developer storage space, 32: first supply roller, 33: second supply roller, 34: development roller, 35: development blade, 36: photosensitive drum, 37: charging roller, 38: cleaning blade, 40: intermediate transfer section, 41: drive roller, 42: driven roller, 43: backup roller, 44: intermediate transfer belt, 45: primary transfer roller, 46: secondary transfer roller, 47: reverse-deflection roller, 48: reverse-deflection backup roller, 49: secondary transfer section, 50: first sheet feed section, 51: sheet cassette, 52: pickup roller, 53: feed roller, 54: retard roller, 55: conveyance guide, 56, 57, 58: conveyance roller pair, 60: second sheet feed section, 61: sheet tray, 62: pickup roller, 63: feed roller, 64: retard roller, DS: density sensor, 65: fixation section, 66: heating part, 67: pressing part, 68: conveyance roller pair, 69: switching section, 70: sheet ejection section, 71: conveyance guide, 72, 73, 74, 75: conveyance roller pair, 76: outlet port, 77: reconveyance section, 80: process controller, 81: development voltage controller, 82: supply voltage controller, 83: exposure controller, 84: transfer voltage controller, 85: motor controller, 86: data presence/absence judgment section, 87: data conversion table, 88: special color silver-dedicated data conversion table, 90: first image forming section, 91: second image forming section, 92: transfer section, 93, 193: controller, PT1, PT101, PT201, PT301, PT401, PT601, PT701, PT801, PT901, PT1001: print pattern, IS: silver developer image, ARIS: silver developer image region, ISS: silver developer image square, IB: black developer image, ARIB: black developer image region, IBS: black developer image square, WH: white color region, P: sheet, TS: silver developer, TB: black developer, DP: concave part, Pn: thin paper, Pc: thick paper, T: developer

What is claimed is:

1. An image forming apparatus comprising:
   a first image forming section capable of forming a brilliant developer image;
   a second image forming section including at least one image forming section capable of forming a black developer image;
   a transfer section capable of transferring the brilliant developer image and the black developer image onto a medium; and
   a controller that controls operation of the first image forming section and the second image forming section according to received print data,
   wherein when forming a brilliant image based on the print data, the controller performs control to form the brilliant image in which relative position between the brilliant developer image and the black developer image is changed depending on a medium type.

2. The image forming apparatus according to claim 1, wherein when forming the brilliant image based on the print data, the controller performs control to form the brilliant image in which a superimposition ratio of the brilliant developer image formed on the black developer image to the black developer image formed on the medium is changed.

3. The image forming apparatus according to claim 2, wherein the medium type represents a roughness of a surface of the medium, and
   wherein when forming the brilliant image on a first medium or a second medium whose surface is rougher than the first medium based on the print data, the controller performs control to form the brilliant image in which the superimposition ratio is greater on the second medium than on the first medium.

4. The image forming apparatus according to claim 2, wherein the medium type represents a thickness of the medium, and
   wherein when forming the brilliant image on a first medium or a second medium thicker than the first medium based on the print data, the controller performs control to form the brilliant image in which the superimposition ratio is greater on the second medium than on the first medium.

5. The image forming apparatus according to claim 2, further comprising an input section through which the superimposition ratio can be adjusted,
   wherein the controller performs control to form the brilliant image in which the superimposition ratio is changed depending on an input result of the input section.

6. The image forming apparatus according to claim 1, wherein the controller performs control to form the brilliant image in which a region of the brilliant developer image is larger than a region of the black developer image.

7. The image forming apparatus according to claim 1, further comprising a storage section that stores a table that associates the medium type with the relative position,
   wherein the controller changes the relative position based on the table.

8. The image forming apparatus according to claim 1, wherein the controller performs control to form the black developer image between the brilliant developer image and the medium.

9. The image forming apparatus according to claim 1, wherein the second image forming section includes the image forming section that forms the black developer image by using a black developer.

10. The image forming apparatus according to claim 1, wherein the second image forming section includes a plurality of image forming sections respectively forming at least a yellow developer image, a magenta developer image and a cyan developer image, and
wherein the black developer image is formed by the yellow developer image, the magenta developer image and the cyan developer image.

11. The image forming apparatus according to claim 1, wherein the brilliant image includes at least the brilliant developer image and the black developer image.

12. An image forming apparatus comprising:
a first image forming section capable of forming a brilliant developer image;
a second image forming section including at least one image forming section capable of forming a black developer image;
a transfer section capable of transferring the brilliant developer image and the black developer image onto a first medium or a second medium whose surface is rougher than the first medium; and
a controller that controls operation of the first image forming section and the second image forming section according to received print data,
wherein when forming a brilliant image on the second medium based on the print data, the controller performs control to form the brilliant image in which relative position between the brilliant developer image and the black developer image is changed in comparison with that on the first medium.

13. An image forming apparatus comprising:
a first image forming section capable of forming a brilliant developer image;
a second image forming section including at least one image forming section capable of forming a black developer image;
a transfer section capable of transferring the brilliant developer image and the black developer image onto a first medium or a second medium thicker than the first medium; and
a controller that controls operation of the first image forming section and the second image forming section according to received print data,
wherein when forming a brilliant image on the second medium based on the print data, the controller performs control to form the brilliant image in which a relative position between the brilliant developer image and the black developer image is changed in comparison with that on the first medium.

14. An image forming apparatus comprising:
a first image forming section capable of forming a brilliant developer image;
a second image forming section including at least one image forming section capable of forming a black developer image;
a transfer section capable of transferring the brilliant developer image and the black developer image onto a medium;
a controller that controls operation of the first image forming section and the second image forming section according to received print data; and
an input section through which a formation position of at least one of the brilliant developer image and the black developer image on the medium can be adjusted,
wherein when forming a brilliant image based on the print data, the controller performs control to form the brilliant image in which relative position between the brilliant developer image and the black developer image is changed depending on an input result of the input section.

15. An image forming apparatus comprising:
a first image forming section capable of forming a brilliant developer image;
a second image forming section including at least one image forming section capable of forming a black developer image;
a transfer section capable of transferring the brilliant developer image and the black developer image onto a medium; and
a controller that controls operation of the first image forming section and the second image forming section according to received print data,
wherein when forming a brilliant image based on the print data, the controller performs control to form the brilliant image in which at least a part of the brilliant developer image and at least a part of the black developer image are superimposed on each other.

* * * * *